US006170932B1

United States Patent
Kanaya et al.

(10) Patent No.: US 6,170,932 B1
(45) Date of Patent: *Jan. 9, 2001

(54) PRINTING SYSTEM, METHOD OF PRINTING, AND RECORDING MEDIUM TO REALIZE THE METHOD

(75) Inventors: Munehide Kanaya; Kazumichi Shimada, both of Nagano-ken (JP)

(73) Assignee: Seiko Epson Corporation, Tokyo (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/081,241

(22) Filed: May 19, 1998

(30) Foreign Application Priority Data

May 20, 1997 (JP) .................................... 9-130101

(51) Int. Cl.$^7$ ........................................ B41J 2/15
(52) U.S. Cl. ................................. 347/41; 347/43
(58) Field of Search ............................. 347/41, 43, 40, 347/12, 15, 10

(56) References Cited

U.S. PATENT DOCUMENTS

| 4,198,642 | 4/1980 | Gamblin ................. 347/41 |
| 4,748,453 | * 5/1988 | Lin et al. ................. 347/43 |
| 4,967,203 | * 10/1990 | Doan et al. ............... 347/43 |
| 5,583,550 | * 12/1996 | Hickman et al. .......... 347/43 |
| 5,844,585 | * 12/1998 | Kurashima et al. ....... 347/43 |

FOREIGN PATENT DOCUMENTS

| 0076948 | 4/1983 | (EP) . |
| 0566318 | 10/1993 | (EP) . |
| 0679518 | 11/1995 | (EP) . |
| 0744706 | 11/1996 | (EP) . |
| 0751476 | 1/1997 | (EP) . |
| 53-2040 | 1/1978 | (JP) . |

* cited by examiner

Primary Examiner—N. Le
Assistant Examiner—Lamson D. Nguyen
(74) Attorney, Agent, or Firm—Oblon, Spivak, McClelland, Maier & Neustadt, P.C.

(57) ABSTRACT

The structure of the present invention effectively prevents banding and enables high-quality printing in a printer which carries out secondary scans in the interlacing manner and thereby prints an image. The printer of the present invention has a print head with a plurality of nozzle arrays formed thereon. Each nozzle array includes a plurality of nozzles arranged at predetermined pitches in the secondary scanning direction. The printer records an image by the interlacing method using part of the nozzles in each nozzle array. The nozzle block in the nozzle array used for formation of dots is changed in every primary scan, and the amount of feed in secondary scan is varied with the change of the nozzle block. Both the nozzle block and the amount of secondary scan are periodically changed in preset sequences. The variation in amount of secondary scan reduces the banding due to the accumulated errors in secondary scans.

12 Claims, 15 Drawing Sheets

| PRINTING RESOLUTION | PRINT MODE | NUMBER OF REPEATED SCANS | NUMBER OF NOZZLES TO BE USED | NOZZLE BLOCK TO BE USED | AMOUNT OF SECONDARY SCAN |
|---|---|---|---|---|---|
| 360DPI | NORMAL PRINT | 1 | 3 | 1 | 3 |
| | NOZZLE BLOCK SELECTING INTERLACE | 1 | 3 | 1 | 3 |
| | | | | 2 | 1 |
| | | | | 1 | 5 |
| 720DPI | NORMAL PRINT | 2 | 6 | 1 | 3 |
| | NOZZLE BLOCK SELECTING INTERLACE | 2 | 6 | 1 | 3 |
| | | | | 2 | 1 |
| | | | | 3 | 1 |
| | | | | 3 | 3 |
| | | | | 2 | 5 |
| | | | | 1 | 5 |

PRINTING SYSTEM, METHOD OF PRINTING, AND RECORDING MEDIUM TO REALIZE THE METHOD

BACKGROUND OF THE INVENTION

1. Field of the Invention

The present invention relates to a printing system that carries out a secondary scan, which shifts a print head relative to a printing medium in a predetermined direction, so as to print an image on the printing medium. The present invention also pertains to a method of printing an image in such a manner and a recording medium on which a program for realizing the method is recorded.

2. Description of the Related Art

Ink jet printers are widely used as a printing system which prints an image processed by a computer or the like. The ink jet printer forms dots and prints an image by causing ink to be spouted from nozzles mounted on a print head to a sheet of paper. The inkjet printer generally carries out both primary scans, which reciprocate the print head relative to the sheet of paper, and secondary scans, which shift the sheet of paper relative to the print head in a secondary scanning direction, so as to print an image. In one known type of the ink jet printers, a plurality of nozzles are arranged at a predetermined pitch in the secondary scanning direction on the print head. This type of ink jet printer with the plurality of nozzles enables plural rows of dots to be printed simultaneously by one primary scan and thereby has the advantage of the high printing speed.

This type of ink jet printer with the print head having the plurality of nozzles, however, had a disadvantage. A distribution of the ink-spouting characteristics of individual nozzles and a distribution of the pitch between adjoining nozzles may cause a deviation of the dot-forming positions. An observable collection of such deviations is called banding. The banding deteriorates the picture quality of a printed image.

Interlace printing has been proposed as the effective technique to prevent the banding as disclosed in, for example, U.S. Pat. No. 4,198,642 and JAPANESE PATENT LAYING-OPEN GAZETTE No. 53-2040. FIG. 18 illustrates an exemplified process of interlace printing. A variety of parameters are used in the following description. In the example of FIG. 18, it is assumed that three nozzles are actually used for formation of dots. A nozzle pitch k [dots] represents an interval between centers of adjoining nozzles on the print head, which is expressed by a pitch in a recorded image (dot pitch w) as the unit. In the example of FIG. 18, k is equal to two. A number of repeated scans s denotes the number of primary scans required to enable each raster line to be filled with dots. In the example of FIG. 18, one primary scan fills each raster line with dots, so that the number of repeated scans s is equal to one. In case that the number of repeated scans s is two or greater, each primary scan intermittently forms dots in the primary scanning direction. L denotes a feeding amount of the sheet of paper in secondary scan and is set equal to three raster lines in the example of FIG. 18.

In the drawing of FIG. 18, circles, each including a number of two figures, represent the recording positions of the respective dots. In the encircled number of two figures, the left-side figure represents the nozzle number and the right-side figure represents the recording sequence (which time of primary scan the dot is recorded).

In the process of interlace printing shown in FIG. 18, the first primary scan causes a second nozzle and a third nozzle to form dots of raster lines, whereas no dots are formed by a first nozzle. After the sheet of paper is fed by the amount corresponding to three raster lines, the second primary scan is carried out to form raster lines with the first through the third nozzles. The step of feeding the sheet of paper by the amount corresponding to three raster lines and the step of carrying out a primary scan to form raster lines are repeated to record an image. The first primary scan does not cause the first nozzle to form any raster line, since the second and the subsequent primary scans do not form an adjoining raster line immediately below the imaginary raster line formed by the first nozzle in the first primary scan.

The interlace printing intermittently forms raster lines in the secondary scanning direction in the above manner to record an image. The interlace printing has an advantage of dispersing the deviation of the dot-forming positions due to the distributions of the nozzle pitch and the ink-spouting characteristics on a resulting recorded image. The interlace printing method accordingly reduces the effects of the distributions of the nozzle pitch and the ink-spouting characteristics and improves the picture quality of the resulting recorded image.

In the example of FIG. 18, at the specific nozzle pitch, each raster line is formed by one primary scan. In the interlace printing, the nozzle pitch k and a number of nozzles Nnz are generally set to be prime to each other. In this case, the amount of feed L is calculated from the number of nozzles Nnz and the number of repeated scans s according to the equation of L=Nnz/s. The interlace printing is realized under such conditions with varying the parameters.

Even in the interlace printing process, when errors occur in the feeding amount of the sheet of paper in secondary scans, banding due to the accumulated errors may appear to deteriorate the picture quality. The recent advance in resolution of the ink jet printers requires further improvement of the picture quality in printed images. Such deterioration of the picture quality is accordingly not negligible. This problem arises not only in the ink jet printers but a variety of other types of printing systems that form dots to print an image.

In the interlace printing, the parameters, such as the number of nozzles Nnz, are specified to satisfy the above conditions. This may cause part of the nozzles mounted on the print head to be not used for printing in the interlace mode. The nozzles that are not used for printing in the interlace mode may be clogged with the remaining ink.

SUMMARY OF THE INVENTION

One object of the present invention is thus to provide a technique that effectively prevents banding and enables high-quality printing.

Another object of the present invention is to prevent unbalanced use of nozzles for printing in the interlace mode.

At least part of the above and the other related objects is realized by a printing system that drives a head to form a raster line, which includes a row of dots aligned in a predetermined direction of a printing medium, and carries out a secondary scan, which shifts the printing medium relative to the head in a secondary scanning direction that is perpendicular to the predetermined direction every time when the raster line is formed, so as to print an image. The head includes a plurality of dot-forming elements, which respectively form dots on the printing medium and are arrayed in the secondary scanning direction. The printing system includes: a selection unit which selects at least part of the plurality of dot-forming elements at least once after a start of printing the image as effective dot-forming elements used for formation of dots; a feed amount setting unit which sets an amount of feed Q in secondary scan after the selection, based on a positional relationship between effective dot-forming elements used for formation of dots before the selection and effective dot-forming elements used for formation of dots after the selection; a secondary scanning unit which carries out the secondary scan by the amount of feed set by the feed amount setting unit; and a print head drive unit which drives only the effective dot-forming elements selected among the plurality of dot-forming elements to form dots.

The present invention is also directed to a method of driving a head to form a raster line, which includes a row of dots aligned in a predetermined direction of a printing medium, and carrying out a secondary scan, which shifts the printing medium relative to the head in a secondary scanning direction that is perpendicular to the predetermined direction every time when the raster line is formed, so as to print an image. The method prints the image with the head having a plurality of dot-forming elements, which respectively form dots on the printing medium and are arrayed in the secondary scanning direction. The method includes the steps of:

(a) selecting at least part of the plurality of dot-forming elements as effective dot-forming elements used for formation of dots at least once after a start of printing the image;

(b) setting an amount of feed in secondary scan after the selection, based on a positional relationship between effective dot-forming elements used for formation of dots before the selection and effective dot-forming elements used for formation of dots after the selection;

(c) carrying out the secondary scan by the amount of feed set in the step (b); and (d) driving only the effective dot-forming elements selected among the plurality of dot-forming elements to form dots.

In the printing system of the present invention and the corresponding method, after a start of printing an image, dot-forming elements are selected as effective dot-forming elements used for formation of dots. The amount of feed in subsequent secondary scan is specified according to the results of selection. By way of example, it is assumed that an image is recorded with ten dot-forming elements #1, #2, . . . , #10 arranged in this sequence. In the printing system of the invention, after a start of printing an image, for example, eight dot-forming elements #1, #2, . . . , #8 are selected as the effective dot-forming elements. The selected eight dot-forming elements form dots in the subsequent primary scan, whereas the non-selected dot-forming elements #9 and #10 do not form any dots. The amount of feed in secondary scan is then set according to the selection of the effective dot-forming elements.

The amount of feed in secondary scan is varied with the change of the effective dot-forming elements selected for formation of dots. In the printing system of the present invention and the corresponding method, the amount of feed in secondary scan is varied after a start of printing the image. The feeding error occurring in secondary scan is generally varied with the variation in amount of feed. The error according to the amount of feed may arise in the increasing direction or in the decreasing direction. The printing system of the present invention and the corresponding method vary the amount of feed in secondary scan to compensate part of the feeding errors, thereby reducing the total feeding error in secondary scans. The printing system of the present invention thus effectively prevents banding and improves the picture quality of a resulting printed image.

As described above, in the printing system of the present invention, the effective dot-forming elements used for printing are changed in the course of printing. This structure effectively prevents unbalanced use of the dot-forming elements for printing. In case that the dot-forming elements are constructed to spout ink and form dots, this structure prevents the dot-forming elements from being dogged with the remaining ink.

In the printing system and the corresponding method discussed above, after the effective dot-forming elements are selected, the amount of feed in secondary scan is set according to the results of selection. The order of the selection and the setting may, however, be inverted. The modified structure first sets the amount of feed in secondary scan and then selects effective dot-forming elements used for formation of dots based on the setting. Namely the required structure selects the effective dot-forming elements and sets the amount of feed in secondary scan in correlation with each other in the course of printing an image.

In the printing system of the present invention and the corresponding method, the selection is carried out at least once after a start of printing the image. This includes a structure of carrying out the selection after an image of a predetermined area is printed and another structure of carrying out the selection every time when a raster line is formed. The selection of the present invention selects at least part of the plurality of dot-forming elements. This implies that all the dot-forming elements may be selected as the effective dot-forming elements. This also implies that part of the plurality of dot-forming elements arrayed in the secondary scanning direction may be selected in a skipping manner. For example, the dot-forming elements may be selected alternately. In the specification hereof, the term 'selection' implies that there is a difference either in the effective dot-forming elements selected for formation of dots or in the amount of feed in secondary scan before and after the selection.

Although the number of the dot-forming elements is ten in the above description, the effects of the present invention do not depend upon the number of the dot-forming elements at all. The selection of the effective dot-forming elements may be carried out arbitrary times. For example, the selection may be executed every time when a raster line is formed. In the above description, the selection of the present invention selects part of the ten dot-forming elements mounted on the print head. All the dot-forming elements existing on the print head may, however, be selected as the effective dot-forming elements. The only requirement is that at least part of the effective dot-forming elements used for formation of dots before the selection should be changed after the selection.

In accordance with one preferable application of the printing system, the effective dot-forming elements selected by the selection unit are arranged consecutively.

This structure enables the amount of feed in secondary scan to be readily specified, in order to form raster lines closely in the secondary scanning direction.

In accordance with one preferable application of the printing system, the number of the effective dot-forming elements selected for formation of dots among the plurality of dot-forming elements is fixed to a preset value N.

In the printing system of this structure, the number of effective dot-forming elements used for printing the image is not changed before and after the selection of the effective dot-forming elements. This enables the amount of feed in secondary scan after the selection to be set readily and adequately.

In the printing system of this structure, it is preferable that the plurality of dot-forming elements included in the head constitute an array arranged at a predetermined pitch that is set as an interval between adjoining dot-forming elements in the secondary scanning direction, and that the amount of feed Q in secondary scan set by the feed amount setting unit is given by an equation below and expressed by a recording pitch of dots in the secondary scanning direction as a unit:

$$Q=N-k(j-i)$$

where k denotes the interval between the adjoining dot-forming elements in the secondary scanning direction expressed by the recording pitch of dots in the secondary scanning direction as the unit, i denotes an element number allocated to a dot-forming element located at a predetermined end of the effective dot-forming elements used for formation of dots before the selection, when numbers are allocated to the plurality of dot-forming elements in ascending sequence from one end of the array in the secondary scanning direction, and j denotes an element number allocated to a dot-forming element located at a corresponding end, which corresponds to the predetermined end, of the effective dot-forming elements used for formation of dots after the selection.

This structure prevents the existence of a vacant raster line due to the change in effective dot-forming elements used for formation of dots and enables dots to be formed in a desired manner.

In accordance with another preferable application of the printing system, a number of the effective dot-forming elements selected for formation of dots among the plurality of dot-forming elements is varied in a predetermined sequence.

This structure enhances the degree of freedom in selection of the effective dot-forming elements used for formation of dots. This accordingly enables appropriate selection of the effective dot-forming elements and adequate setting of the amount of feed in secondary scan, in order to further improve the picture quality of the resulting recorded image.

In accordance with another preferable application of the printing system, the print head drive unit divides each the raster line by the secondary scan into a predetermined number of divisions S, which is not less than 2, and the feed amount setting unit sets the amount of feed Q in secondary scan after the selection, based on the positional relationship between the effective dot-forming elements used for formation of dots before the selection and the effective dot-forming elements used for formation of dots after the selection as well as the predetermined number of divisions S of the each raster line.

The printing system of this structure forms each raster line in the overlapping manner. For example, the overlapping process may divide each raster line into two divisions. In this case, the first primary scan forms dots of the odd ordinal numbers in each raster line, and the second primary scan forms dots of the even ordinal numbers using the dot-forming elements different from those of the first primary scan. In a similar manner, each raster line may be divided into three or more divisions. The overlapping process causes each raster line to be recorded with different dot-forming elements, thus dispersing the deviation of the dot-forming positions due to the mechanical production errors of the individual dot-forming elements. The printing system of the overlapping structure accordingly reduces the possibility of banding and further improves the picture quality of the resulting printed image.

In the printing system of this structure, it is preferable that the number of the effective dot-forming elements selected for formation of dots among the plurality of dot-forming elements is fixed to a preset value N. This preferable structure enables the amount of feed in secondary scan after the selection to be set readily and adequately.

In the printing system of this structure, it is further preferable that the plurality of dot-forming elements included in the head constitute an array arranged at a predetermined pitch that is set as an interval between adjoining dot-forming elements in the secondary scanning direction, and that the amount of feed Q in secondary scan set by the feed amount setting unit is given by an equation below and expressed by a recording pitch of dots in the secondary scanning direction as a unit:

$$Q=N/S-k(j-i)$$

where k denotes the interval between the adjoining dot-forming elements in the secondary scanning direction expressed by the recording pitch of dots in the secondary scanning direction as the unit, i denotes an element number allocated to a dot-forming element located at a predetermined end of the effective dot-forming elements used for formation of dots before the selection, when numbers are allocated to the plurality of dot-forming elements in ascending sequence from one end of the array in the secondary scanning direction, and j denotes an element number allocated to a dot-forming element located at a corresponding end, which corresponds to the predetermined end, of the effective dot-forming elements used for formation of dots after the selection.

This structure prevents the existence of a vacant raster line due to the change in effective dot-forming elements used for formation of dots and enables dots to be formed in a desired manner. In the present invention, when the total number of the dot-forming elements is set equal to A, the number of the effective dot-forming elements N selected for formation of dots is smaller than A (N<A). The interval k between the adjoining dot-forming elements in the secondary scanning direction and the value N/S are prime to each other. The predetermined number of divisions S is a factor of N.

In the printing system that records each raster line according to the overlap printing process, a number of the effective dot-forming elements selected for formation of dots among the plurality of dot-forming elements is varied in a predetermined sequence.

This structure enhances the degree of freedom in selection of the effective dot-forming elements used for formation of dots.

At least part of the above objects is also realized by a concrete structure of the printing system. The present invention is accordingly directed to a printing system that drives a head to form a raster line, which includes a row of dots aligned in a predetermined direction of a printing medium, and carries out a secondary scan, which shifts the printing medium relative to the head in a secondary scanning direction that is perpendicular to the predetermined direction every time when the raster line is formed, so as to print an image. The head has a plurality of nozzles, which respectively form dots on the printing medium and are arrayed in the secondary scanning direction. The printing system includes: a memory which stores data applied to select at least part of the plurality of nozzles at least once after a start of printing the image as effective nozzles used for formation of dots; a secondary scanning controller which carries out the secondary scan by an amount of feed in secondary scan specified after the selection, based on a positional relationship between effective nozzles used for formation of dots before the selection and effective nozzles used for formation of dots after the selection; and a print head controller which drives only the effective nozzles selected among the plurality of nozzles based on the data stored in the memory, so as to form dots.

The printing system of this concrete structure has nozzles as the dot-forming elements. In one typical example, the nozzles spout ink to form dots on the printing medium, although the principle of the present invention is also applicable to other types of printing systems. In this concrete structure, the selection of the nozzles after a start of printing an image and the setting of the feeding amount in secondary scan after the selection are realized electrically with the memory and the controller. The controller may be a general-purpose control element, such as a CPU, or an exclusive control circuit.

All the structures of the present invention discussed above are applicable not only to the printing system that carries out the primary scans reciprocating the head relative to the printing medium to form raster lines but to the other types of printing systems that form raster lines without such primary scans. The principle of the present invention is further applicable to the impact dot-type printing systems and thermal transfer-type printing systems, as well as the printing systems spouting ink.

In the printing system of the present invention, the computer may carry out control of the head and secondary scans to record dots according to a program. Another application of the present invention is a recording medium on which such a program is recorded.

In a printing system with a head having a plurality of dot-forming elements that respectively form dots, the present invention is directed to a recording medium on which a program is recorded in a computer-readable manner. The program controls a secondary scan which shifts a printing medium relative to the head in a secondary scanning direction. The program includes:

a first program code which causes a computer to select at least part of the plurality of dot-forming elements at least once after a start of printing an image as effective dot-forming elements used for formation of dots; and a second program code which causes the computer to set an amount of feed in secondary scan after the selection, based on a positional relationship between effective dot-forming elements used for formation of dots before the selection and effective dot-forming elements used for formation of dots after the selection.

The computer executes the program recorded on the recording medium to realize the printing system of the present invention. Examples of the recording media include flexible disks, CD-ROMs, magneto-optic discs, IC cards, ROM cartridges, punched cards, prints with codes, such as bar codes, recorded thereon, internal storage units (memories, such as RAMs and ROMs) and external storage units of the computer, and a variety of other computer-readable media. Another application of the present invention is a program supply apparatus which supplies the computer programs for realizing the control functions of the printing system to the computer via a communication path.

These and other objects, features, aspects, and advantages of the present invention will become more apparent from the following detailed description of the preferred embodiment with the accompanying drawings.

DESCRIPTION OF THE PREFERRED EMBODIMENTS

One mode of carrying out the present invention is discussed below as a preferred embodiment.

(1) Structure of Apparatus

Figure 1:
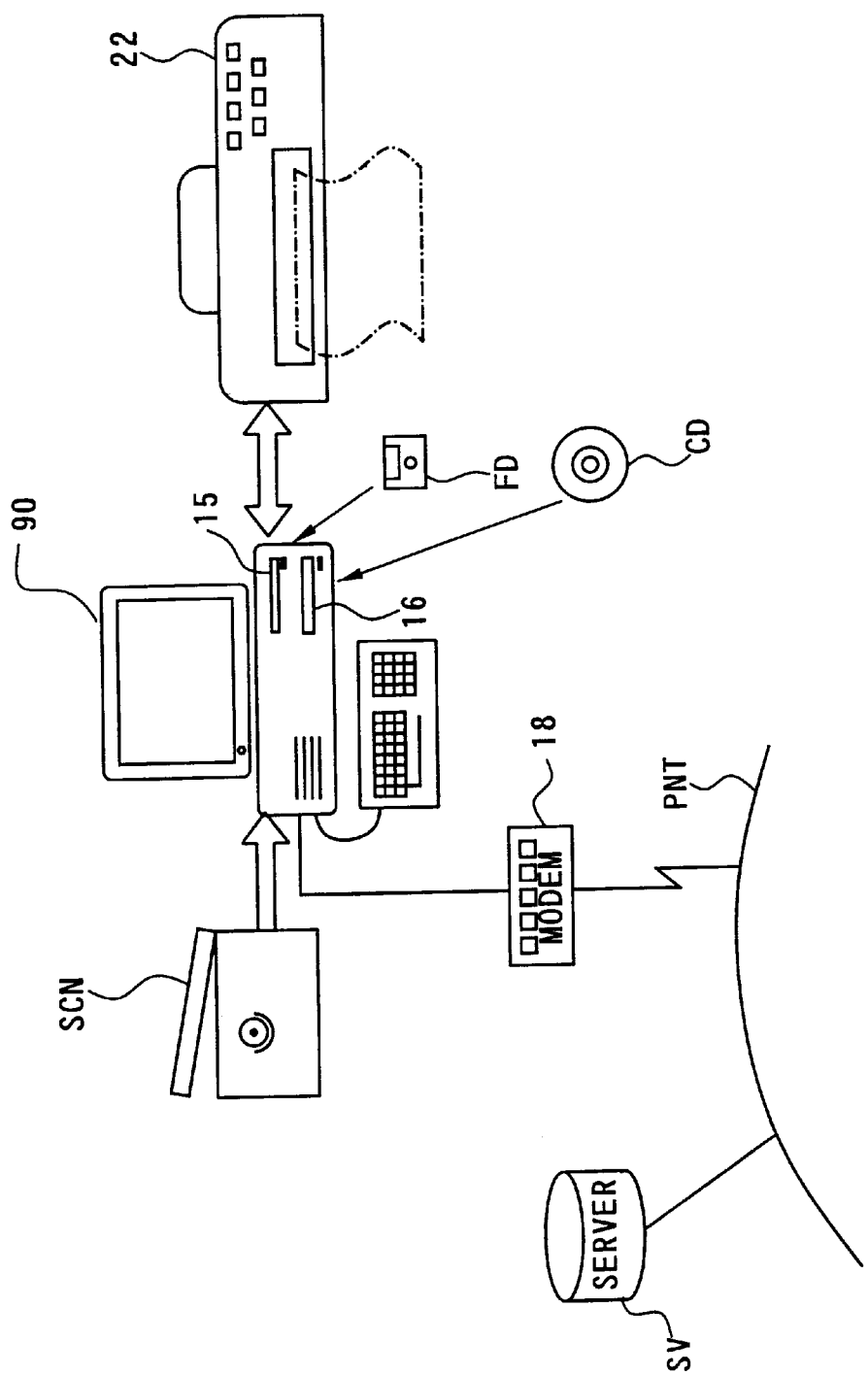
FIG. 1 is a block diagram schematically illustrating structure of an image processing apparatus with a color printer 22 as one embodiment of a printing system of the present invention.

Referring to FIG. 1, a scanner SCN and the color printer 22 are connected to a computer 90. The computer 90 processes images input, for example, from the scanner SCN according to a variety of applications programs. When an applications program outputs an instruction to print an image, the computer 90 activates a printer driver incorporated therein to convert print image data to print data that are printable by the printer 22, and output the converted print data to the printer 22. The printer 22 receives the output print data and prints an image while executing a variety of controls discussed later. The printer 22 of this embodiment carries out printing in a variety of print modes as discussed later. Data transferred from the computer 90 to the printer 22 include data used for specifying a print mode.

The computer 90 includes a flexible disk drive 15 and a CD-ROM drive 16, which respectively read programs recorded on a flexible disk FD and a CD-ROM. The computer 90 is connectable with a public telephone network PNT via a modem 18. The computer 90 connects with a specific server SV linked with an external network via the public telephone network PNT and downloads programs into a hard disk incorporated in the computer 90. The computer 90 may transfer a variety of data as well as the downloaded programs to the printer 22.

Figure 2:
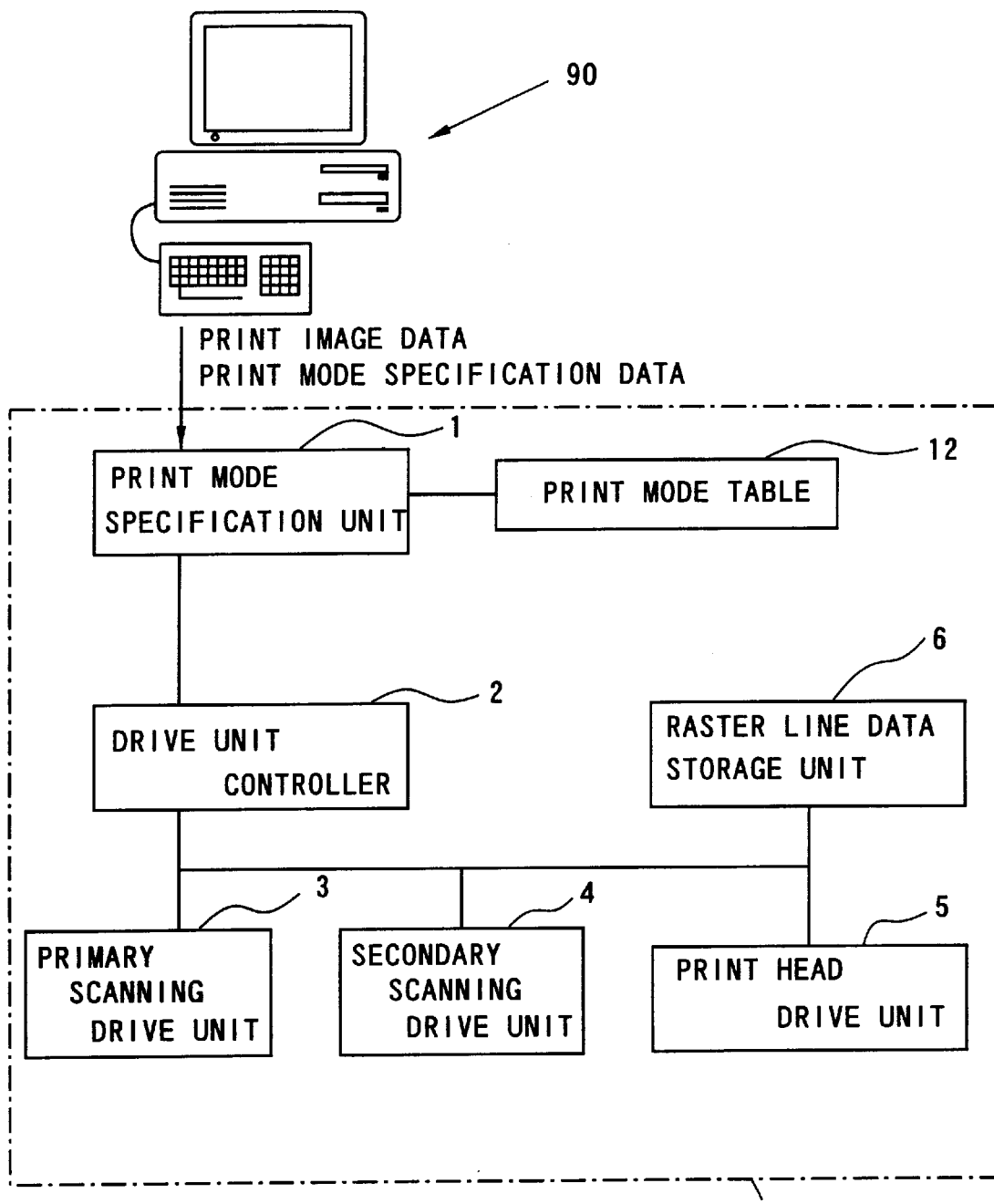
FIG. 2 is a block diagram illustrating software structure of this embodiment.

FIG. 2 is a block diagram illustrating software structure of this embodiment. The printer 22 of this embodiment includes a print mode specification unit 1, a print mode table 12, a drive unit controller 2, a primary scanning drive unit 3, a secondary scanning drive unit 4, a print head drive unit 5, and a raster line data storage unit 6.

Data transferred from the computer 90 to the printer 22 include print image data and print mode specification data. The print mode specification unit 1 refers to the print mode table 12 based on the print mode specification data, and specifies the number of nozzles used for formation of dots and the amount of feed in secondary scan. The contents of the print mode table 12 will be described in detail later. Data representing the quantities specified by the print mode specification unit 1 are transferred to the drive unit controller 2. The drive unit controller 2 controls the driving amounts and the driving timings of the primary scanning drive unit 3, the secondary scanning drive unit 4, and the print head drive unit 5. The primary scanning drive unit 3 carries out primary scans that reciprocate a print head, whereas the secondary scanning drive unit 4 feeds a sheet of paper in the secondary scanning direction that is perpendicular to the primary scanning direction. The print head drive unit 5 drives the nozzles on the print head and causes ink to spout onto the sheet of paper, based on the print image data stored in the raster line data storage unit 6.

Figure 3:
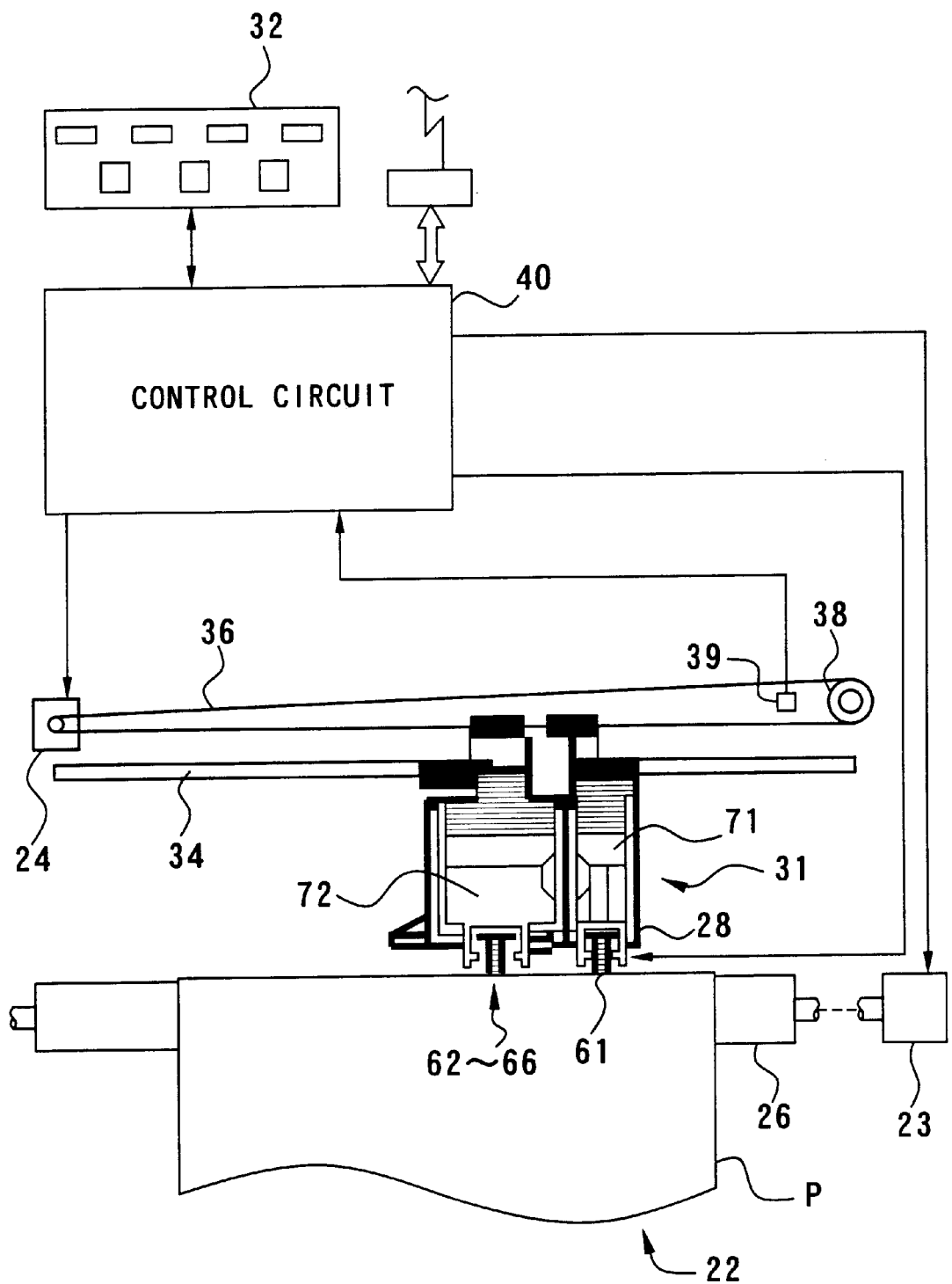
FIG. 3 schematically illustrates structure of the printer 22.

FIG. 3 schematically illustrates structure of the printer 22. The printer 22 has a mechanism for feeding a sheet of paper P by means of a sheet feed motor 23, a mechanism for reciprocating a carriage 31 along the axis of a platen 26 by means of a carriage motor 24, a mechanism for driving a print head 28 mounted on the carriage 31 to control spout of ink and formation of dots, and a control circuit 40 for transmitting signals to and from the sheet feed motor 23, the carriage motor 24, the print head 28, and a control panel 32. The following describes these mechanisms in this sequence.

The mechanism for feeding the sheet of paper P has a gear train (not shown) that transmits rotations of the sheet feed motor 23 to the platen 26 as well as to a sheet feed roller (not shown). The mechanism for reciprocating the carriage 31 along the axis of the platen 26 includes a sliding shaft 34 that is arranged in parallel with the axis of the platen 26 to slidably support the carriage 31, a pulley 38, an endless drive belt 36 spanned between the carriage motor 24 and the pulley 38, and a position sensor 39 that detects the position of the origin of the carriage 31.

A black ink cartridge 71 for black ink (Bk) and a color ink cartridge 72 in which five color inks, that is, cyan (C1), light cyan (C2), magenta (M1), light magenta (M2), and yellow (Y), are accommodated may be mounted on the carriage 31 of the printer 22. Both the higher-density ink (dark ink) and the lower-density ink (light ink) are provided for the two colors, cyan and magenta. A total of six ink spout heads 61 through 66 are formed on the print head 28 that is disposed in the lower portion of the carriage 31, and ink supply conduits 67 (see FIG. 4) are formed in the bottom portion of the carriage 31 for leading supplies of inks from ink tanks to the respective ink spout heads 61 through 66. When the black ink cartridge 71 and the color ink cartridge 72 are attached downward to the carriage 31, the ink supply conduits 67 are inserted into connection apertures (not shown) formed in the respective cartridges. This enables supplies of inks to be fed from the respective ink cartridges to the ink spout heads 61 through 66.

Figure 4:
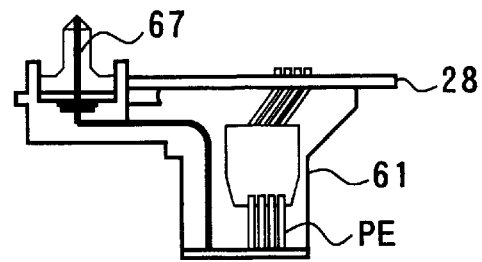
FIG. 4 schematically illustrates internal structure of the print head 28.
Figure 4:
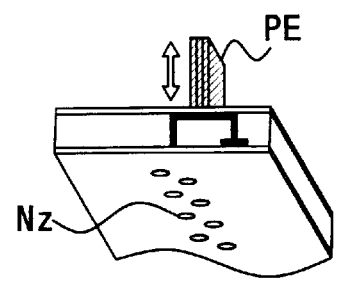

The following describes the mechanism of spouting ink and forming dots. FIG. 4 schematically illustrates internal structure of the print head 28. When the ink cartridges 71 and 72 are attached to the carriage 31, supplies of inks in the ink cartridges 71 and 72 are sucked out by capillarity through the ink supply conduits 67 and are led to the ink spout heads 61 through 66 formed in the print head 28 arranged in the lower portion of the carriage 31 as shown in FIG. 4. In case that the ink cartridges 71 and 72 are attached to the carriage 31 for the first time, a pump works to suck first supplies of inks into the respective ink spout heads 61 through 66. In this embodiment, structures of the pump for suction and a cap for covering the print head 28 during the suction are not illustrated nor described specifically.

Figure 5:
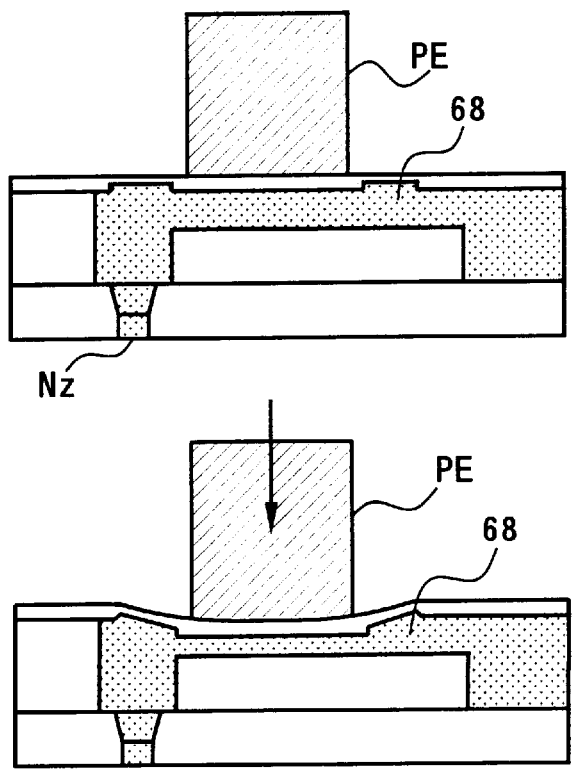
FIG. 5 illustrates the principle of formation of dots in the printer 22 of the embodiment.

An array of forty-eight nozzles Nz (see FIG. 6) are formed in each of the ink spout heads 61 through 66 as discussed later. A piezoelectric element PE, which is one of electrically distorting elements and has an excellent response, is arranged for each nozzle Nz. FIG. 5 illustrates a configuration of the piezoelectric element PE and the nozzle Nz. As shown in the upper drawing of FIG. 5, the piezoelectric element PE is disposed at a position that comes into contact with an ink conduit 68 for leading ink to the nozzle Nz. As is known, the piezoelectric element PE has a crystal structure that is subjected to mechanical stress due to application of a voltage and thereby carries out extremely high-speed conversion of electrical energy to mechanical energy. In this embodiment, application of a voltage between electrodes on either ends of the piezoelectric element PE for a predetermined time period causes the piezoelectric element PE to extend for the predetermined time period and deform one side wall of the ink conduit 68 as shown in the lower drawing of FIG. 5. The volume of the ink conduit 68 is reduced with an extension of the piezoelectric element PE, and a certain amount of ink corresponding to the reduced volume is sprayed as ink particles Ip from the end of the nozzle Nz at a high speed. The ink particles Ip soak into the sheet of paper P set on the platen 26, so as to implement printing.

Figure 6:
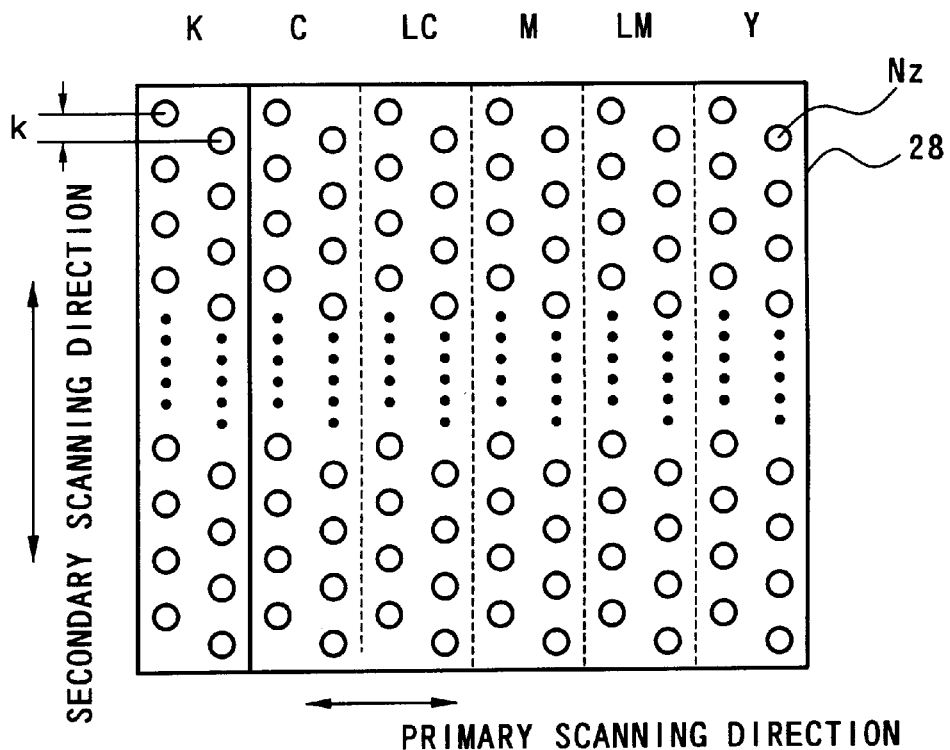
FIG. 6 shows an arrangement of ink jet nozzles Nz in the ink spout heads 61 through 66.

FIG. 6 shows an arrangement of the ink jet nozzles Nz in the ink spout heads 61 through 66. The arrangement includes six nozzle arrays, wherein each nozzle array spouts ink of each color and includes forty-eight nozzles Nz arranged in zigzag at a fixed nozzle pitch k. The positions of the nozzles in the secondary scanning direction are identical in the respective nozzle arrays. The forty-eight nozzles Nz included in each nozzle array may be arranged in alignment instead of in zigzag. The zigzag arrangement as shown in FIG. 7 allows a small value to be set to the nozzle pitch k in the manufacture.

Figure 7:
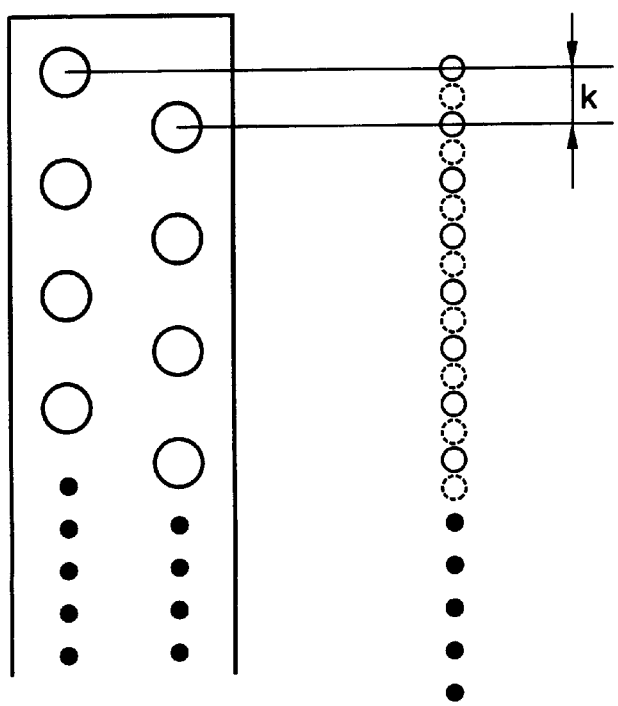
FIG. 7 shows the relationship between the arrangement of the nozzle array and the dots actually formed by the nozzle array.

FIG. 7 shows the relationship between the arrangement of the nozzle array and the dots actually formed by the nozzle array. The left-side drawing of FIG. 7 is an enlarged view of the nozzle array, whereas the right-side drawing shows dots actually formed. The open circles shown by the broken lines in the right-side drawing represent dots that can be formed through a secondary scan of the nozzle array. In this embodiment, the ratio of the nozzle pitch to the recording pitch is equal to two to one. In order to prevent a dropout of dots, each dot has the diameter partially overlapping the adjoining dots both in the primary scanning direction and in the secondary scanning direction.

Figure 8:
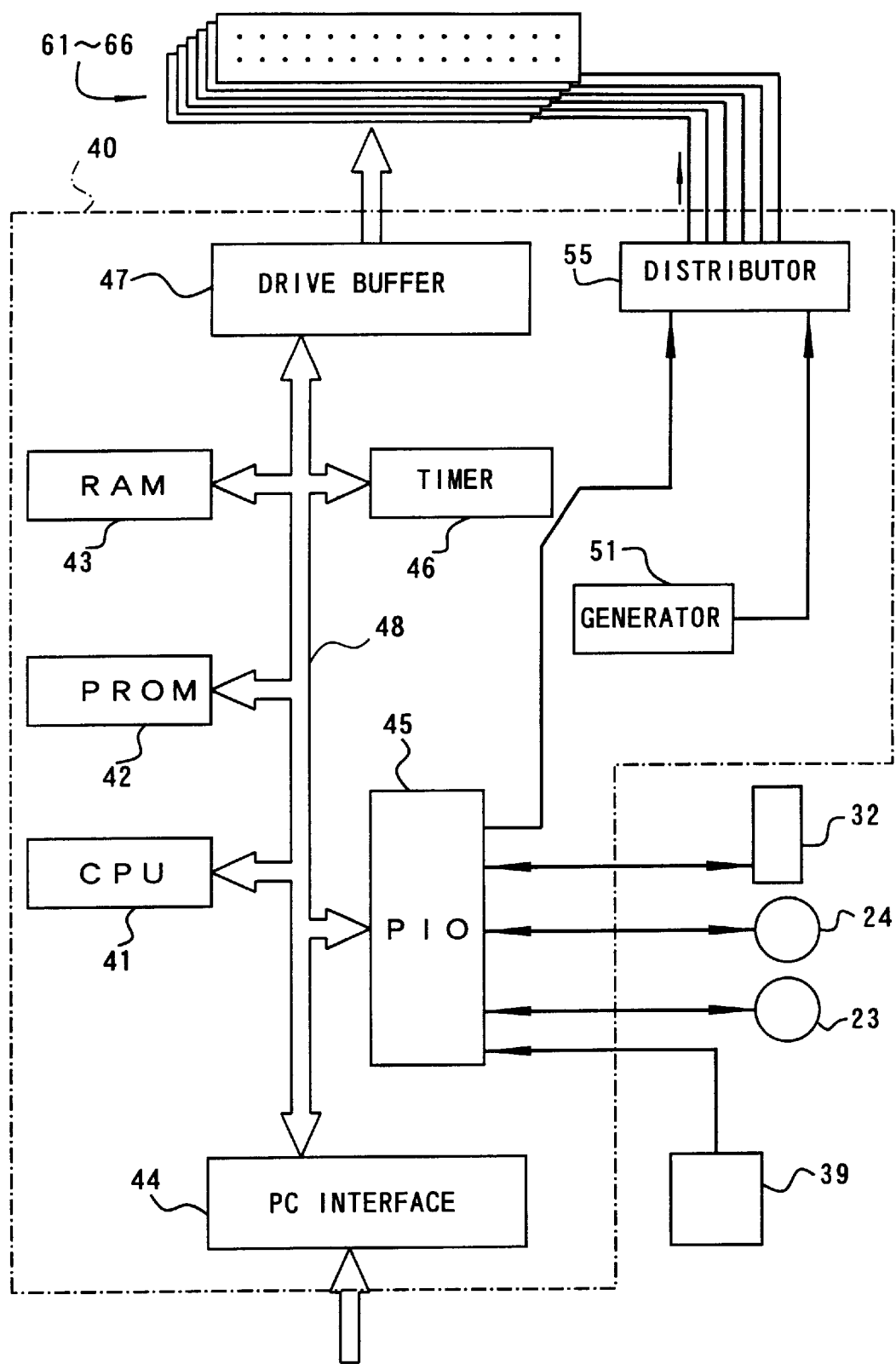
FIG. 8 illustrates internal structure of the control circuit 40 of the printer 22.

The following describes the internal structure of the control circuit 40 of the printer 22 and the method of driving the print head 28 with the plurality of nozzles Nz shown in FIG. 6. FIG. 8 illustrates internal structure of the control circuit 40. Referring to FIG. 8, the control circuit 40 includes a CPU 41, a PROM 42, a RAM 43, a PC interface 44 that transfers data to and from the computer 90, a peripheral input-output unit (PIO) 45 that transmits signals to and from the sheet feed motor 23, the carriage motor 24, and the control panel 32, a timer 46 that counts the time, and a drive buffer 47 that outputs on-off signals of dots to the ink spout heads 61 through 66. These elements and circuits are mutually connected via a bus 48.

The control circuit 40 also includes a generator 51 that outputs driving waveforms (see FIG. 9) at a predetermined frequency and a distributor 55 that distributes the output from the generator 51 to the ink spout heads 61 through 66 at a preset timing. The control circuit 40 receives the print image data processed by the computer 90, temporarily stores the input print image data into the RAM 43, and outputs the print image data to the drive buffer 47 at a predetermined timing. The control circuit 40 also controls primary scans of the carriage 31, driving of the respective nozzles, and secondary scans. The drive buffer 47 corresponds to the raster line data storage unit 6 shown in FIG. 2.

Figure 9:
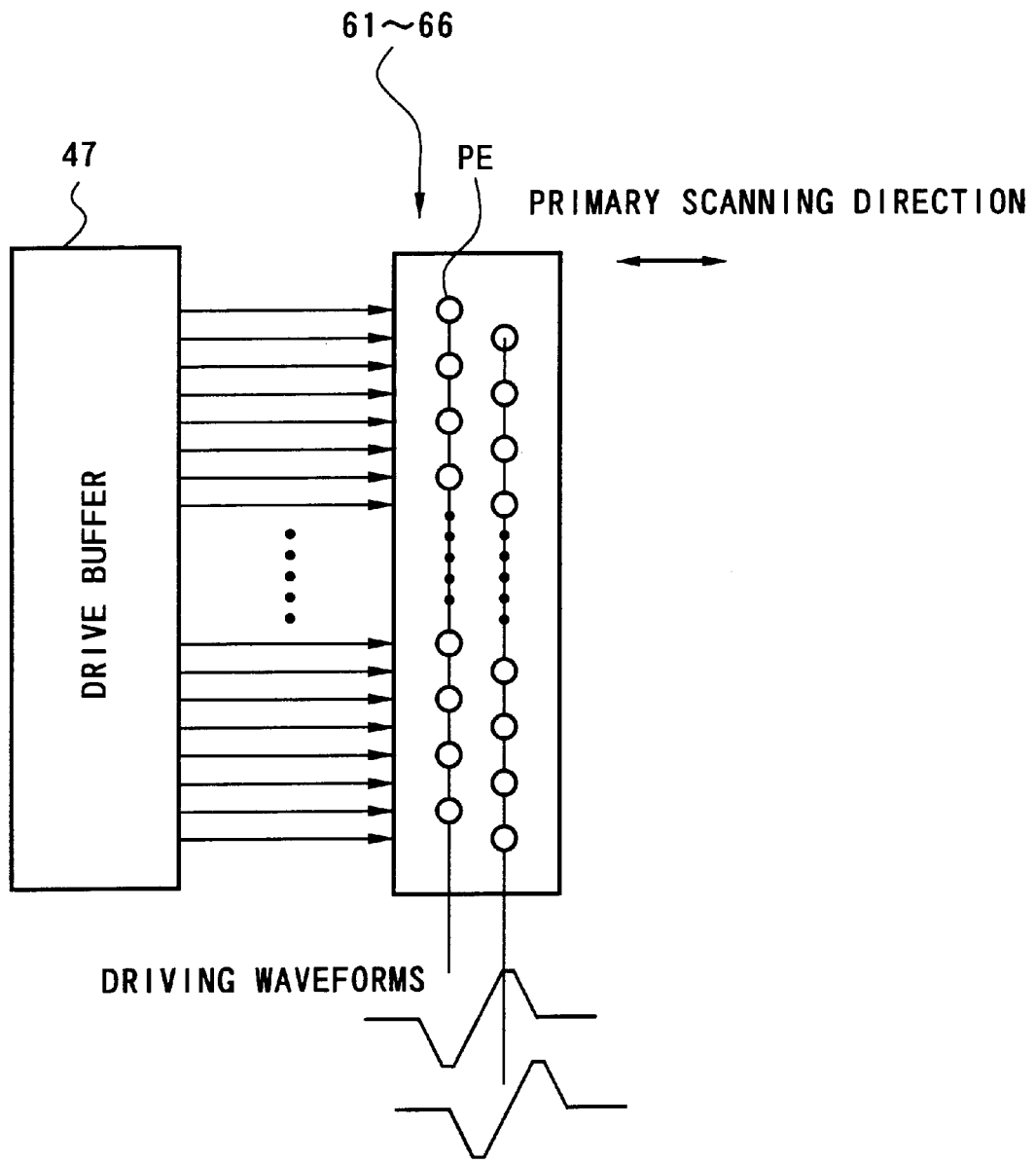
FIG. 9 shows the process of transmitting signals for forming dots to the nozzle array in the ink spout heads 61 through 66.

The control circuit 40 outputs signals to the respective ink spout heads 61 through 66 in the following manner. FIG. 9 shows the process of transmitting signals for forming dots to the nozzle array in the ink spout heads 61 through 66. Each nozzle array in the respective ink spout heads 61 through 66 is disposed in a circuit with the drive buffer 47 as the source and the distributor 55 as the sink. Each piezoelectric element PE included in the nozzle array has one electrode connected to each output terminal of the drive buffer 47 and the other electrode connected to a common output terminal of the distributor 55. The distributor 55 outputs driving waveforms of the generator 51 as shown in FIG. 9. When the CPU 41 determines the on/off state of each nozzle and outputs signals to the respective terminals of the drive buffer 47, only the piezoelectric elements PE receiving the ON signal from the drive buffer 47 are driven according to the driving waveforms. This causes the nozzles corresponding to the piezoelectric elements PE receiving the ON signal from the drive buffer 47 to spout ink particles Ip.

As shown in FIG. 6, the ink spout heads 61 through 66 are arranged in the feeding direction of the carriage 31, so that the respective nozzle arrays reach a fixed position on the sheet of paper P at different timings. The CPU 41 takes into account the difference in position among the corresponding nozzles of the ink spout heads 61 through 66 and outputs the on-off signals of the respective dots via the drive buffer 47 at required timings to form dots of the respective colors. The CPU 41 controls output of the on-off signals by taking into account the zigzag arrangement of nozzles in the respective ink spout heads 61 through 66 as shown in FIG. 6.

In the printer 22 having the hardware structure described above, while the sheet feed motor 23 rotates a pair of paper feed rollers and other rollers to feed the sheet of paper P, the carriage motor 24 reciprocates the carriage 31. At the same time, the piezoelectric elements PE of the respective ink spout heads 61 through 66 of the print head 28 are driven to spout the respective color inks and form dots, thereby producing multi-colored image on the sheet of paper P.

As described previously, this embodiment regards the printer 22 with the head that spouts ink using the piezoelectric elements PE. The printer may, however, spout ink according to another procedure. By way of example, the principle of the present invention may be applied to a printer which supplies electricity to a heater disposed in an ink conduit and spouts ink by means of the bubbles produced in the ink conduit. The principle of the present invention is further applicable to impact dot printers and thermal transfer printers.

(2) Printing Control Process

Figure 10:
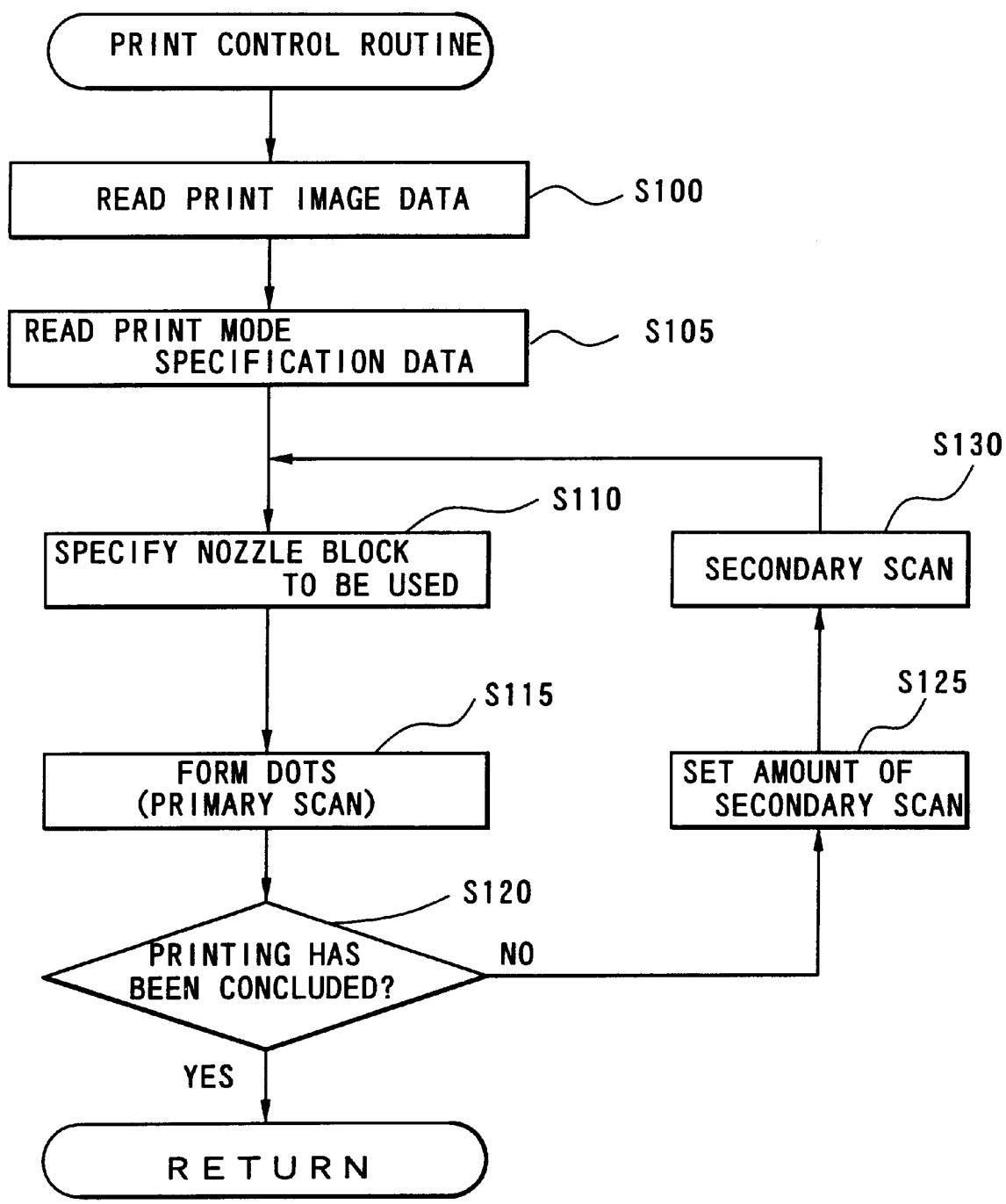
FIG. 10 is a flowchart showing the flow of a print control routine.

The printer 22 of this embodiment carries out a print control process. FIG. 10 is a flowchart showing the flow of a print control routine. This routine is executed by the CPU 41 (see FIG. 8) of the printer 22. When the program enters the print control routine of FIG. 10, the CPU 41 first reads print image data at step S100. The print image data are a series of data that have been processed by the computer 90 and represent the on-off state of the respective nozzles in the ink spout heads 61 through 66. The CPU 41 reads print mode specification data at step S105 simultaneously with the input of the print image data at step S100, and specifies the nozzle block to be used, based on the print mode specification data at step S110.

Figures 11, 12:
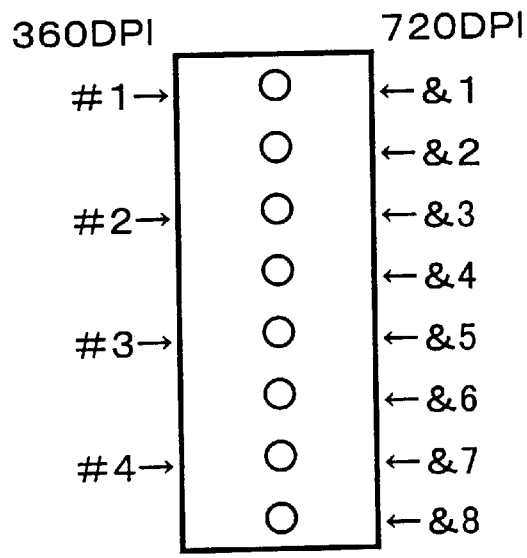
FIG. 11 shows the contents of the print mode table 12.
FIG. 12 shows the nozzles to be used with respect to the specified resolutions.

The following describes the procedure of specifying the print mode and the nozzle block to be used. The print mode specification unit 1 shown in FIG. 2 refers to the print mode table 12 and specifies the nozzle block to be used. FIG. 11 shows the contents of the print mode table 12. Although the printer 22 of this embodiment actually has forty-eight nozzles on each head as described above, for the clarity of explanation, it is assumed that each head has eight nozzles in the description below.

Information recorded in the print mode table 12 represent the resolving power of printing (printing resolution) and the printing conditions corresponding to the resolution. The printing conditions include the combination of nozzle blocks to be used (that is, the sequence of changing the nozzle blocks) and the amount of feed (that is, the amount of secondary scan). In this embodiment, the print mode with respect to the printing resolution of 360 dpi can be switched between a normal print mode and a nozzle block selecting interlace mode. The print mode with respect to the printing resolution of 720 dpi can be switched between a normal print mode (normal overlap print mode) and a nozzle block selecting interlace mode (nozzle block selecting overlap interlace mode). The print image data transferred from the computer 90 and used for printing are identical in either of the two modes in the case of the printing resolution of 360 dpi. In a similar manner, the print image data are identical in either of the two modes in the case of the printing resolution of 720 dpi The print mode specification data read at step S105 specify the printing resolution and the print mode.

The print mode table 12 has the following settings with respect to the printing resolution of 360 dpi. In the normal print mode, the values stored in the print mode table 12 are the number of repeated scans=1, the number of nozzles to be used=3, the nozzle block to be used=1, and the amount of secondary scan=3. The number of repeated scans implies the number of primary scans required for forming each raster line. The number of nozzles to be used represents the number of nozzles actually used for printing out of all the nozzles arranged on the head. FIG. 12 shows the nozzles to be used with respect to the specified resolutions. In the case of printing at the low resolution of 360 dpi, four nozzles #1 through #4 are usable among the eight nozzles disposed on the head. Referring back to FIG. 11, in case that the normal print mode is selected, three nozzles out of the four usable nozzles are used for printing. The value registered in the item regarding the nozzle block to be used specifies the first nozzle of the nozzle array to be used for printing among the plurality of nozzles disposed on the head. In the normal print mode, the value '1' is set to the nozzle block to be used. Since the number of nozzles to be used is equal to three, three nozzles #1, #2, and #3 are used for printing in this case. The amount of secondary scan represents the amount of feed in secondary scan as the recording pitch of the dots.

When the nozzle block selecting interlace mode is selected in the case of the printing resolution of 360 dpi, on the other hand, the respective parameters are set in the following manner. The number of repeated scans and the number of nozzles to be used are identical with the settings in the normal print mode. In each primary scan, three nozzles are selected as the nozzle block. The nozzle block to be used is successively changed in the sequence of 1→2→1 in the course of the primary scan. Namely the nozzle block to be used is periodically changed as 1→2→1→1→2 . . . While the nozzle block to be used is changed, the number of nozzles to be used is fixed to three. The nozzle block to be used corresponds to the nozzles used for printing in the following manner:

Nozzle block to be used=1→#1, #2, #3; and

Nozzle block to be used=2→#2, #3, #4.

The amount of secondary scan is also successively changed in the course of the primary scan. The amount of secondary scan is varied as 3, 1, and 5 with the change in nozzle block to be used as 1, 2, and 1.

The nozzle block to be used has the following relation to the amount of feed in secondary scan. When the nozzle block to be used is changed from i to j, an amount of feed Q in secondary scan is expressed as Equation (1):

$$Q=N-k(j-i) \qquad (1)$$

where N denotes the number of nozzles to be used and k (dot pitch) denotes the nozzle interval on the nozzle array in the secondary scanning direction (see FIG. 6). In this embodiment, for example, the nozzle interval k is equal to 2 and the number of nozzles to be used is equal to 3. When the nozzle block to be used is changed from 1 to 2, the amount of feed Q in secondary scan is given as:

$$Q=3-2(2-1)=1$$

The value '1' thus obtained is registered as the amount of secondary scan corresponding to the nozzle block to be used=2 in the table of FIG. 11.

The print mode table 12 has the following settings with respect to the printing resolution of 720 dpi. In the normal print mode, the values stored in the print mode table 12 are the number of repeated scans=2, the number of nozzles to be used=6, the nozzle block to be used=1, and the amount of secondary scan=3. Since the number of repeated scans is equal to two, each raster line is formed by two primary scans. This means that printing is carried out by the overlapping procedure. In the case of the high printing resolution, the high quality of picture is generally desired. The overlap printing method is thus applied in such cases. In accordance with one modification, each raster line may be formed by one primary scan. Referring again to FIG. 12, all the eight nozzles &1 through &8 are usable in the case of printing at the high resolution of 720 dpi. Six nozzles &1 through &6 out of the eight usable nozzles are used for printing in the normal print mode.

When the nozzle block selecting interlace mode is selected in the case of the printing resolution of 720 dpi, on the other hand, the number of repeated scans and the number of nozzles to be used are identical with the settings in the normal print mode. The nozzle block to be used is successively changed in the sequence of 1→2→3→3→2→1 in the course of the primary scan. Namely the nozzles used for printing are periodically changed in this sequence. The nozzle block to be used corresponds to the nozzles used for printing in the following manner:

Nozzle block to be used=1→&1, &2, &3, &4, &5, &6;

Nozzle block to be used=2→&2, &3, &4, &5, &6, &7; and

Nozzle block to be used=3→&3, &4, &5, &6, &7, &8.

The amount of feed (the amount of secondary scan) is also successively changed in the course of the primary scan. The amount of secondary scan is varied as 3, 1, 1, 3, 5, and 5 with the change in nozzle block to be used as 1, 2, 3, 3, 2, and 1.

The nozzle block to be used has the following relation to the amount of feed in secondary scan. When the nozzle block to be used is changed from i to j, the amount of feed Q in secondary scan is expressed as Equation (2):

$$Q=N/S-(j-i)k \qquad (2)$$

where N denotes the number of nozzles to be used, k (dot pitch) denotes the nozzle interval on the nozzle array in the secondary scanning direction (see FIG. 6), and S denotes the number of repeated scans. In this embodiment, for example, the nozzle interval k is equal to 2 and the number of nozzles to be used is equal to 6. When the nozzle block to be used is changed from 1 to 2, the amount of feed Q in secondary scan is given as:

$$Q=6/2-2(2-1)=1$$

The value '1' thus obtained is registered as the amount of secondary scan corresponding to the nozzle block to be used=2 in the table of FIG. 11.

In the above description, when each nozzle array on the print head 28 includes A nozzles, the number of nozzles N constituting the nozzle block is smaller than A(N<A), where k and N/S are prime to each other and S is a factor of N.

Referring back to the flowchart of FIG. 10, the CPU 41 refers to the print mode table 12, in which the variety of values discussed above are stored, and selects the nozzle block to be used according to the print mode specification data at step S110.

The CPU 41 subsequently carries out a primary scan to form dots at step S115. This step implies the primary scan and printing operation carried out by the primary scanning drive unit 3 via the drive unit controller 2 in FIG. 2. The CPU 41 here carries out the processing to form a raster line with the nozzle block previously selected. In accordance with a concrete procedure, the CPU 41 controls the addresses of data transfer to the drive buffer 47 (see FIG. 8) according to the nozzle block to be used. By way of example, when the nozzles #1 through #3 are used out of the four usable nozzles #1 through #4 shown in FIG. 12, the print image data read at step S100 are transferred to the addresses of the drive buffer 47 corresponding to the nozzles #1 through #3. Mask data which prevent spout of ink are transferred to the nozzle #4.

After carrying out a primary scan to form dots, the CPU 41 determines whether or not printing has been concluded at step S120. The determination is based on the existence or non-existence of unprocessed print image data among the print image data temporarily stored in the RAM 43 and the existence or non-existence of print image data to be newly transferred from the computer 90. When neither unprocessed print image data nor print image data to be newly transferred exist, it is determined that printing has been concluded.

In case that any unprocessed print image data exist, the CPU 41 determines to continue printing and proceeds to step S125 to refer to the print mode table 12 and set the amount of secondary scan. In accordance with a concrete procedure of step S125, the print mode specification unit 1 reads the amount of secondary scan from the print mode table 12. The CPU 41 subsequently carries out a secondary scan based on the amount of secondary scan at step S130. This step implies the secondary scan carried out by the secondary scanning drive unit 4 via the drive unit controller 2. In this manner, the primary scan and the secondary scan are repeated until all the print image data have been processed.

The primary scan and the secondary scan are carried out in the same manner as described above in case that the overlap mode (nozzle block selecting overlap interlace mode) is selected as the print mode.

Figure 13:
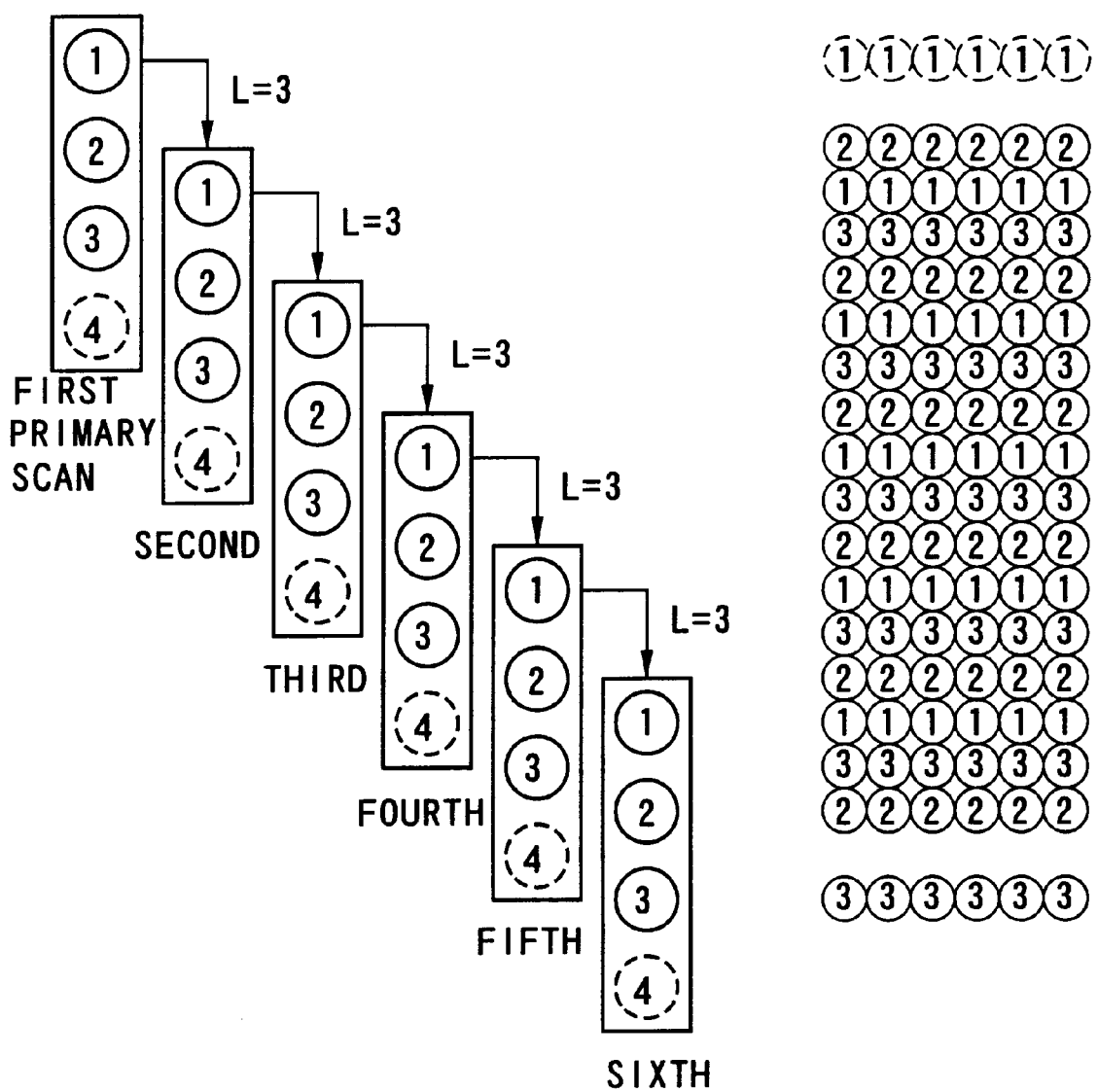
FIG. 13 shows dots formed in the normal print mode at a low resolution.

A concrete operation of the ink jet printer 22 of this embodiment is described with the drawings of FIGS. 13 through 16. FIG. 13 shows dots formed in the normal print mode at the printing resolution of 360 dpi (hereinafter may be referred to as the low resolution). For convenience of illustration, in the example of FIG. 13, the print head has a nozzle array including four nozzles arranged at the nozzle intervals of 2 dot pitch. The four nozzles correspond to the nozzles #1 through #4 shown in FIG. 12. The nozzles are shown as the open circles on the left side of FIG. 13. The encircled figures respectively denote the nozzles #1 through #4 shown in FIG. 12. The left side of FIG. 13 shows the change in relative position of the head from the first to the sixth primary scans. The right side of FIG. 13 shows rows of dots formed when the head exists at the respective positions. The open circles show the dots, and the encircled figures respectively denote the nozzle numbers which form the dots.

As shown in FIG. 11, the three nozzles #1 through #3 are used in the normal print mode at the low resolution. In the example of FIG. 13, the nozzle #4 which is not used for formation of dots is shown by the broken line. Secondary scans with these three nozzles by a fixed amount corresponding to three dots enable an image to be printed as shown on the right side of FIG. 13. In the first primary scan, the nozzle #1 does not actually form any raster line of dots. This is because an adjoining raster line immediately below the imaginary raster line formed by the nozzle #1 is vacant as shown on the right side of FIG. 13.

Figure 14:
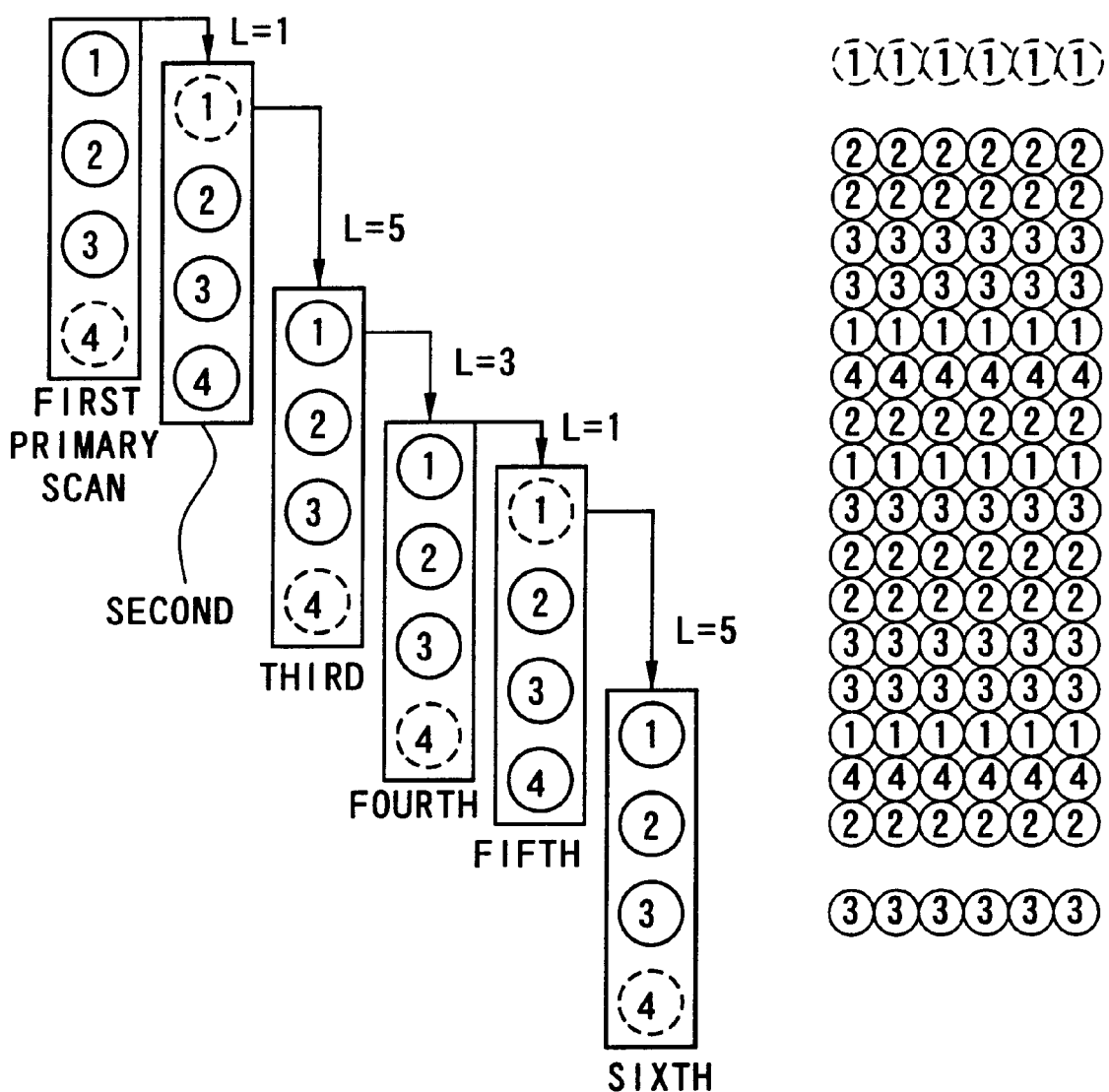
FIG. 14 shows dots formed in the nozzle block selecting interlace mode at the low resolution.

FIG. 14 shows dots formed in the nozzle block selecting interlace mode at the low resolution. The figures and symbols in FIG. 14 have the identical meanings to those in FIG. 13. The following describes the process of recording dots in the nozzle block selecting interlace mode by referring to the table of FIG. 11. Since the value '3' is set to the number of nozzles to be used in the table of FIG. 11, three nozzles are used for all the primary scans in this mode. The nozzles #1 through #3 are used for the first primary scan. In the first primary scan, the nozzle #4 shown by the broken line in FIG. 14 is not used for formation of dots. Because of the same reason as that discussed in the example of FIG. 13, the nozzle #1 does not actually form any dots in the first primary scan.

The nozzles #2 through #4 are used for the second primary scan. In the second primary scan, the nozzle #1 shown by the broken line in FIG. 14 is not used for formation of dots. As dearly understood from the table of FIG. 11, the amount of feed in secondary scan is set equal to one. After the secondary scan by an amount corresponding to one dot, the second primary scan is carried out to form dots. The nozzles #1 through #3 are used again for the third primary scan. The amount of feed in secondary scan is set equal to five at this moment. After the secondary scan by an amount corresponding to five dots, the third primary scan is carried out to form dots. This procedure is repeated to form a printed image.

The recording in the nozzle block selecting interlace mode (see FIG. 14) is compared with the recording in the normal print mode (see FIG. 13). Both modes allow dots to be formed in an identical area. In the normal print mode, the combination of nozzles used to form dots and print an image is fixed to the combination of the nozzles #1 through #3, so that the amount of feed in the secondary scanning direction is fixed. In the nozzle block selecting interlace mode, on the other hand, the combination of the nozzles used to form dots and print an image is changed, so that the amount of feed in the secondary scanning direction is varied periodically.

As described above, in the nozzle block selecting interlace mode at the low resolution, the combination of nozzles to be used (that is, the nozzle block to be used) is changed in the sequence of (#1,#2,#3→(#2,#3,#4)→(#1,#2,#3). The amount of secondary scan in each primary scan is changed in the sequence of 1 dot pitch→5 dot pitch→3 dot pitch. Namely the total of 9 dot pitch (1+5+3) is attained by every three paths. In this case, the mean amount of feed in secondary scan is equal to 3 dot pitch in each of the three paths. This coincides with the amount of feed in secondary scan in the normal print mode.

Figure 15:
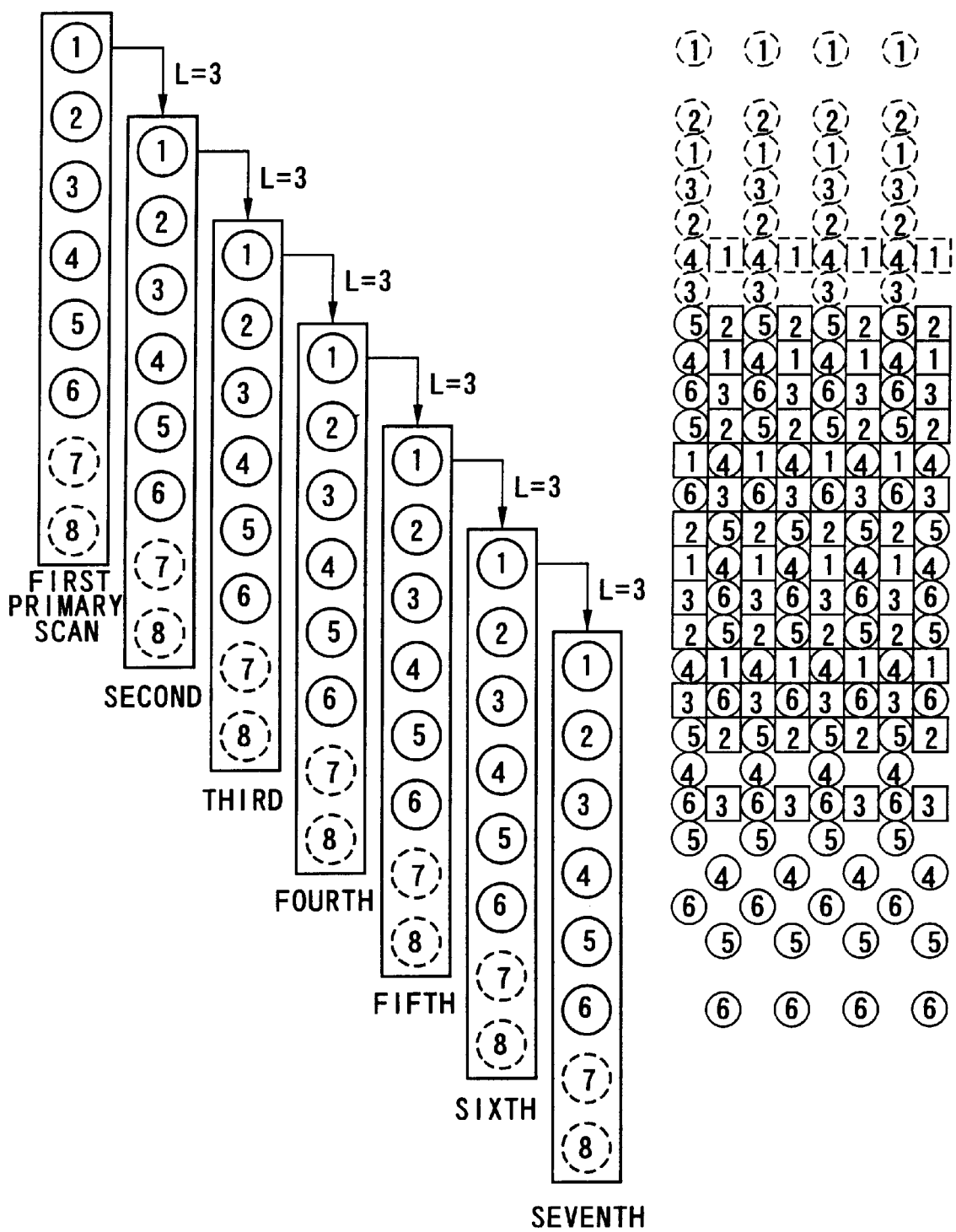
FIG. 15 shows dots formed in the normal print mode at a high resolution.

FIG. 15 shows dots formed in the normal print mode at the printing resolution of 720 dpi (hereinafter may be referred to as the high resolution). The figures and symbols in FIG. 15 have the identical meanings to those in FIG. 13. As shown in the table of FIG. 11, in the normal print mode at the high resolution, the nozzle block includes six nozzles selected out of the nozzle array consisting of the eight nozzles arranged at the nozzle interval of 2 dot pitch. These six nozzles correspond to the nozzles &1 through &6 shown in FIG. 12. These six nozzles are used to implement the overlap printing with the number of repeated scans equal to 2. In the example of FIG. 15, the nozzles &7 and &8 which are not used for formation of dots are shown by the broken line.

Referring to FIG. 15, when a secondary scan is carried out by a fixed amount of feed equal to 3 dot pitch to form each raster line, the position of the nozzle &4 in the first primary scan is identical with the position of the nozzle &1 in the third primary scan in the secondary scanning direction. In this manner, each raster line can be formed by two different nozzles. In the normal print mode, data constituting each raster line are divided into an odd group and an even group; the odd group consists of data having the odd ordinal numbers counted from the left end of FIG. 15, whereas the even group consists of data having the even ordinal numbers. Data corresponding to formation of dots having the odd ordinal numbers include mask data that represent nonformation of dots and are set to pixels of the even ordinal numbers. Data corresponding to formation of dots having the even ordinal numbers, on the other hand, include mask data that are set to pixels of the odd ordinal numbers. The print image data set in his manner are transferred from the computer 90. The CPU 41 of the printer 22 transfers the data to the addresses in the drive buffer 47 corresponding to the respective nozzles, so as to implement the overlap printing. As shown in FIG. 15, the nozzles &1 through &4 do not actually form the dots in the first primary scan, whereas the nozzles &1 through &3 do not actually form the dots in the second primary scan. This is because the raster lines formed by these nozzles or the adjoining raster lines are incomplete as shown in FIG. 15.

Figure 16:
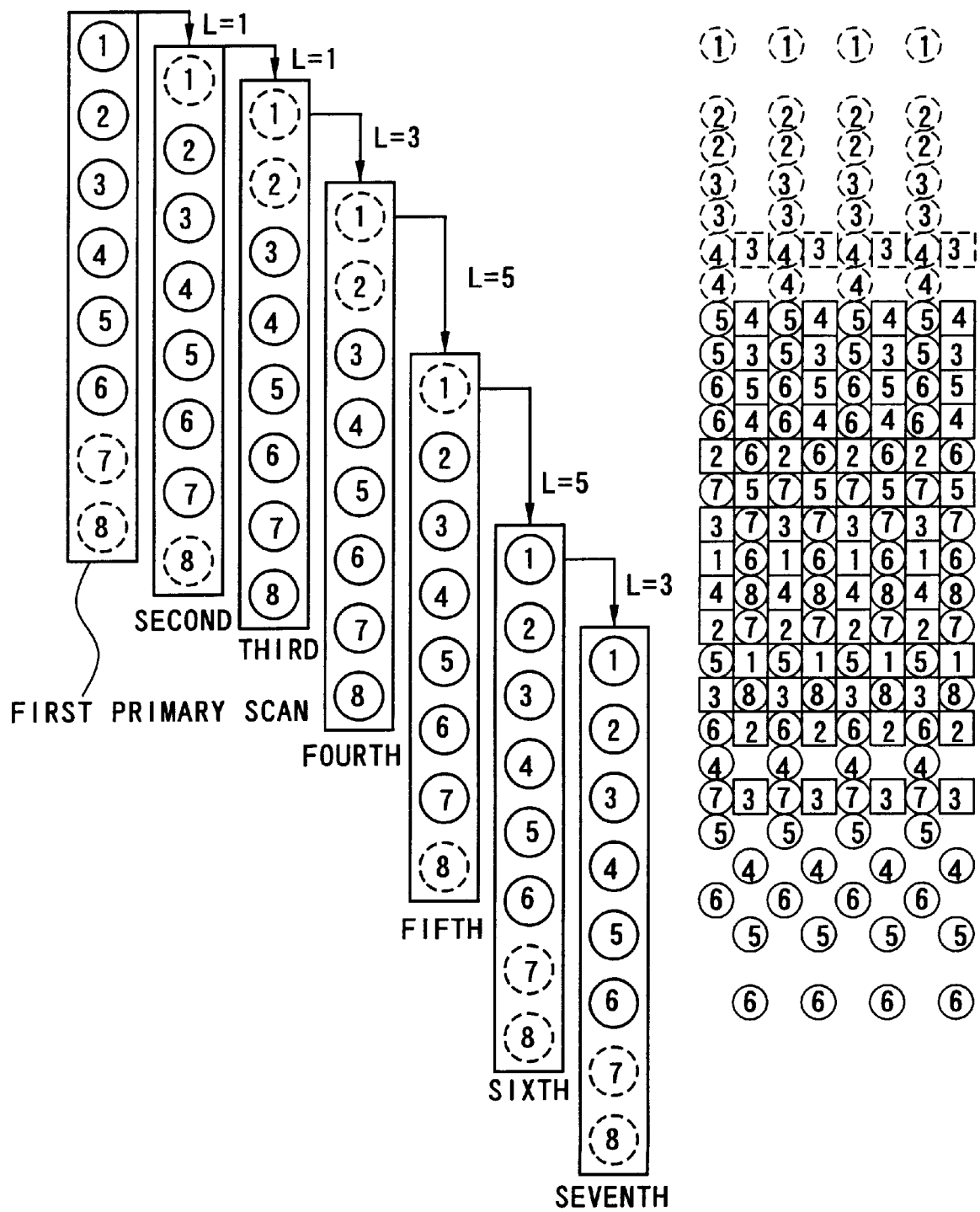
FIG. 16 shows dots formed in the nozzle block selecting interlace mode at the high resolution.

FIG. 16 shows dots formed in the nozzle block selecting interlace mode at the high resolution. The figures and symbols in FIG. 16 have the identical meanings to those in FIG. 13. The following describes the process of recording dots in the nozzle block selecting interlace mode by referring to the table of FIG. 11. Since the value '6' is set to the number of nozzles to be used in the table of FIG. 11, six nozzles are used for all the primary scans in this mode. The number of repeated scans is also set equal to two in this mode, so that the overlap printing method is applied to form each raster line by two primary scans like in the normal print mode. The nozzles &1 through &6 are used for the first primary scan. In the first primary scan, the nozzles &7 and &8 shown by the broken line in FIG. 16 are not used for formation of dots. Because of the same reason as that discussed in the example of FIG. 15, the nozzles &1 through &4 dot not actually form any dots in the first primary scan.

The nozzles &2 through &7 are used for the second primary scan. In the second primary scan, the nozzles &1 and &8 shown by the broken line in FIG. 16 are not used for formation of dots. As clearly understood from the table of FIG. 11, the amount of feed in secondary scan is set equal to one. After the secondary scan by an amount corresponding to one dot, the second primary scan is carried out to form dots. The nozzles &3 through &8 are used for the third primary scan. The amount of feed in secondary scan is also set equal to one. After the secondary scan by an amount corresponding to one dot, the third primary scan is carried out to form dots. This procedure is repeated to form a printed image. In the nozzle block selecting interlace mode at the high resolution, the combination of nozzles to be used (that is, the nozzle block to be used) is changed in the sequence of (&1 through &6)→(&2 through &7)→(&3 through &8)→(&3 through &8)→(&2 through &7)→(&1 through &6).

The recording in the nozzle block selecting interlace mode (see FIG. 16) is compared with the recording in the normal print mode (see FIG. 15). Both modes allow dots to be formed in an identical area. In the normal print mode, the combination of nozzles used to form dots and print an image is fixed to the combination of the nozzles &1 through &6, so that the amount of feed in the secondary scanning direction is fixed. In the nozzle block selecting interlace mode, on the other hand, the combination of the nozzles used to form dots and print an image is changed, so that the amount of feed in the secondary scanning direction is varied periodically. In accordance with a concrete procedure, with a periodical change of the nozzle block to be used, the amount of secondary scan in each primary scan is changed in the sequence of 1 dot pitch→1 dot pitch→3 dot pitch→5 dot pitch→5 dot pitch→3 dot pitch. Namely the total of 18 dot pitch (1+1+3+5+5+3) is attained by every six paths. In this case, the mean amount of feed in secondary scan is equal to 3 dot pitch in each of the six paths. This coincides with the amount of feed in secondary scan in the normal print mode.

As described above, the printer 22 of this embodiment carries out interlace recording while changing the amount of secondary scan in the nozzle block selecting interlace mode, so as to print a resulting image. The feed error occurring in the secondary scan is generally varied with a change in amount of feed. The error according to the amount of feed may appear in the increasing direction or in the decreasing direction. The printer 22 of this embodiment thus effectively prevents the positions where dots are formed from being deviated in the secondary scanning direction due to the accumulated errors in secondary scans. This structure prevents banding and enables high-quality printing.

Some nozzles are not used for printing in the interlace printing with a fixed mount of feed as shown in FIGS. 13 and 15. In the printer 22 of this embodiment, on the other hand, the nozzle block used for printing is changed as discussed above. The two types of nozzle blocks, that is, the nozzle blocks of#1 through #3 and #2 through #4, are used at the low resolution. The three types of nozzle blocks, that is, the nozzle blocks of &1 through &6, &2 through &7, and &3 through &8, are used at the high resolution. This structure effectively prevents unbalanced use of the dot-forming elements for printing, thereby preventing part of the nozzles from being clogged.

Although the above description refers to the case with eight nozzles as a matter of convenience of illustration, the printer 22 of the embodiment actually has forty-eight nozzles on each head as shown in FIG. 6. The principle of the present invention is applicable to any number of nozzles and any resolution other than those specified in the above embodiment. The nozzle block to be used may be specified arbitrarily other than the settings shown in the table of FIG. 11.

In the above embodiment, the number of nozzles to be used is fixed in the nozzle block selecting interlace mode. As shown in the table of FIG. 11, the number of nozzles to be used is set equal to three at the low resolution and equal to six at the high resolution. One possible modification may change the number of nozzles to be used. In the above embodiment, the number of repeated scans is set equal to one at the low resolution and equal to two at the high resolution. The number of repeated scans may be set equal to a greater value or equal to one at both the low resolution and the high resolution.

Figure 17:
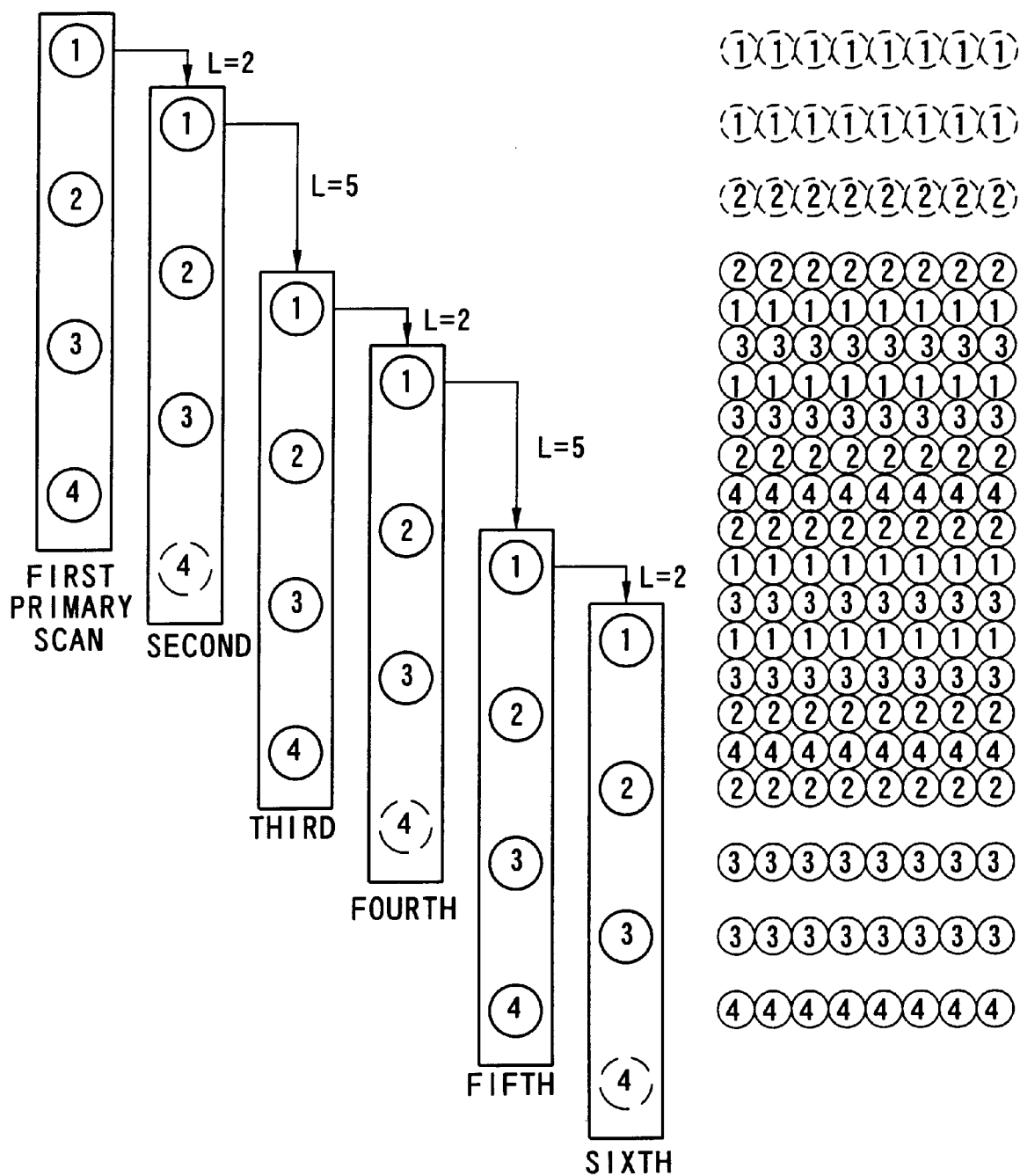
FIG. 17 shows dots formed in the nozzle block selecting interlace mode when the number of nozzles actually used is varied.
Figure 18:
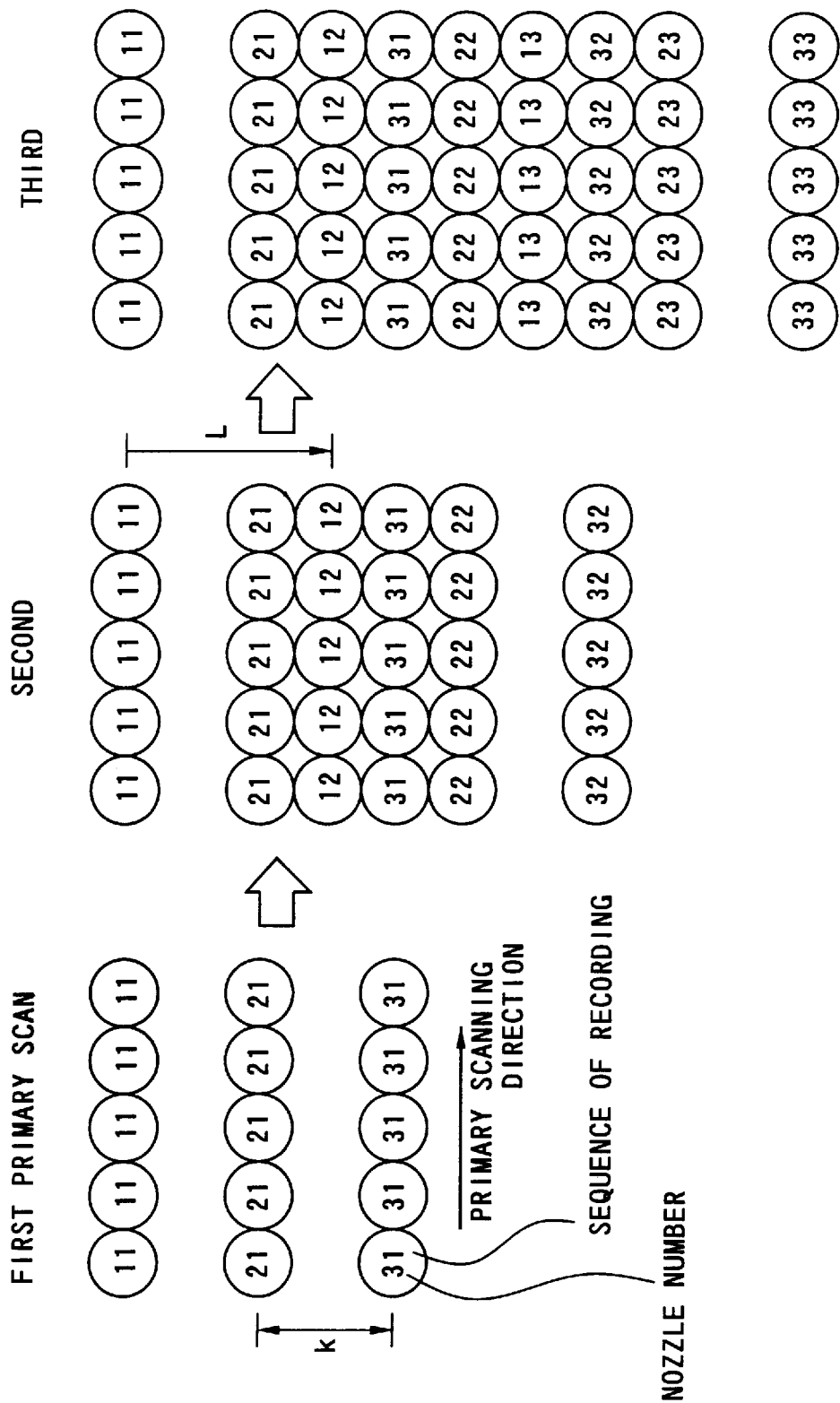
FIG. 18 shows the process of recording dots according to the interlacing method.

FIG. 17 shows the process of recording dots when the number of nozzles actually used is varied. The figures and symbols in FIG. 17 have the identical meanings to those in FIG. 13. In the example of FIG. 17, the head has four nozzles #1 through #4 that are arranged at the pitch of 6 dots in the secondary scanning direction. The number of repeated scans is set equal to one. The number of nozzles actually used is changed periodically between four and three. All the nozzles #1 through #4 are used when the number of nozzles actually used is equal to four. The nozzles #1 through #3 are used when the number of nozzles actually used is equal to three. Namely the nozzle block to be used is repeatedly changed between (#1 through #4) and (#1 through #3). The amount of feed in secondary scan is also repeatedly changed between the value '2' and the value '5' corresponding to the number of nozzles actually used.

Although not being specifically illustrated, the following two sets of data are stored in the print mode table 12 of FIG. 11 in this example:

Number of nozzles to be used=4,
Nozzle block to be used=1,
Amount of feed in secondary scan=5; and
Number of nozzles to be used=3,
Nozzle block to be used=1,
Amount of feed in secondary scan=2.

The nozzles #1 through #4 are used for the first primary scan. Because of the same reason as those discussed in the above examples, however, the nozzles #1 and #2 do not actually form dots in the first primary scan. After the secondary scan by an amount corresponding to two dots, the second primary scan is carried out to form dots. The nozzles #1 through #3 are used for the second primary scan. In the second primary scan, the nozzle #4 shown by the broken line in FIG. 17 is not used for formation of dots. After the secondary scan by an amount corresponding to five dots, the third primary scan is carried out to form dots. The nozzles #1 through #4 are used again for the third primary scan. This procedure is repeated to complete an image.

Dots can be recorded to constitute an image while the number of nozzles to be used is varied. The structure of allowing a variation in number of nozzles to be used significantly enhances the degree of freedom in selection of the nozzle block to be used. This allows appropriate selection of the nozzle block, in order to realize the effective amount of feed in secondary scan for the further improvement in picture quality of the resulting image or in order to reduce the unbalanced use of the nozzles. Although the number of nozzles to be used is changed alternately between two preset values in the above example, a variety of combinations may be applicable to this structure. This structure is not restricted to the nozzle pitch and the number of nozzles described in the above example.

In the examples discussed above, consecutive nozzles among the plurality of nozzles mounted on the head are selected as the nozzle block to be used. Another possible structure may select non-consecutive nozzles among the plurality of nozzles mounted on the head. For example, two nozzles #1 and #3 may be selected among the nozzles #1 through #4 shown in FIG. 17 as the nozzle block to be used.

The above embodiment regards the ink jet printer with the nozzles as the dot-forming elements. The principle of the present invention may, however, be applied to other printing systems with dot-forming elements, for example, impact dot printers, thermal printers, and thermal transfer printers. The principle of the present invention is also applicable to various types of ink jet printers other than the ink jet printer using the piezoelectric elements described in the above embodiment. One example of such ink jet printers supplies electricity to a heater attached to the nozzles and spouts ink by means of bubbles produced by heating the ink.

As described above, in the printer 22 of the embodiment, the CPU 41 executes the control software to implement the print control process (FIG. 10). The present invention may accordingly be realized as a recording medium, on which programs for realizing the control process are recorded. Examples of the recording media include flexible disks, CD-ROMs, magneto-optic discs, IC cards, ROM cartridges, punched cards, prints with codes, such as bar codes, recorded thereon, internal storage units (memories, such as RAMs and ROMs) and external storage units of the computer, and a variety of other computer-readable media. Another application of the present invention is a program supply apparatus which supplies the computer programs for realizing the control process of the printing system to the computer via a communication path. These programs may be executed by the computer 90 or by the control circuit 40 included in the printer 22.

The present invention is not restricted to the above embodiment or its modifications, but there may be many other modifications, changes, and alterations without departing from the scope or spirit of the main characteristics of the present invention. For example, part or even all of the print control process discussed in the above embodiment may be realized by hardware. The print control process executed by the CPU 41 of the printer 22 in the above embodiment may be carried out by the CPU included in the computer 90.

It should be clearly understood that the above embodiment is only illustrative and not restrictive in any sense. The scope and spirit of the present invention are limited only by the terms of the appended claims.

What is claimed is:

1. A printing system that drives a head to form a raster line, which comprises a row of dots aligned in a predetermined direction of a printing medium, and carries out a secondary scan, which shifts said printing medium relative to said head in a secondary scanning direction that is perpendicular to the predetermined direction every time when said raster line is formed, so as to print an image, wherein said head comprises a plurality of dot-forming elements, which respectively form dots on said printing medium and are arrayed in the secondary scanning direction, said printing system comprising:

a selection unit configured to select at least part of the plurality of dot-forming elements at least once after a start of printing the image as effective dot-forming elements used for formation of dots, thereby changing the effective dot-forming elements;

a feed amount setting unit configured to set an amount of feed in secondary scan after said selection, based on a positional relationship between effective dot-forming elements used for formation of dots before said selection and effective dot-forming elements used for formation of dots after said selection;

a secondary scanning unit configured to carry out the secondary scan feeding the printing medium by the amount of feed; and a print head drive unit which drives only the effective dot-forming elements selected among the plurality of dot-forming elements to form dots.

2. A printing system in accordance with claim 1, wherein the effective dot-forming elements selected by said selection unit are arranged consecutively.

3. A printing system in accordance with claim 1, wherein a number of the effective dot-forming elements selected for formation of dots among the plurality of dot-forming elements is fixed to a preset value N.

4. A printing system in accordance with claim 3, wherein the plurality of dot-forming elements constitute an array arranged at a predetermined pitch that is set as an interval between adjoining dot-forming elements in the secondary scanning direction, and the amount of feed Q in secondary scan is given by an equation below and expressed by a recording pitch of dots in the secondary scanning direction as a unit:

$$Q=N-k(j-i)$$

where k denotes the interval between the adjoining dot-forming elements in the secondary scanning direction expressed by the recording pitch of dots in the secondary scanning direction as the unit, i denotes an element number allocated to a dot-forming element located at a predetermined end of the effective dot-forming elements used for formation of dots before said selection, where element numbers are allocated to the plurality of dot-forming elements in order from an upper end of the array of the plurality of dot-forming elements in the secondary scanning direction, and j denotes an element number allocated to a dot-forming element located at the predetermined end of the effective dot-forming elements used for formation of dots after said selection.

5. A printing system in accordance with claim 1, wherein a number of the effective dot-forming elements selected for formation of dots among the plurality of dot-forming elements is varied in a predetermined sequence.

6. A printing system in accordance with claim 1, wherein said print head drive unit divides each said raster line by the secondary scan into a predetermined number of repeated scans S, which is not less than 2, and said feed amount setting unit sets the amount of feed in secondary scan after said selection, based on the positional relationship between the effective dot-forming elements used for formation of dots before said selection and the effective dot-forming elements used for formation of dots after said selection as well as the predetermined number of repeated.

7. A printing system in accordance with claim 6, wherein a number of the effective dot-forming elements selected for formation of dots among the plurality of dot-forming elements is fixed to a preset value N.

8. A printing system in accordance with claim 7, wherein the plurality of dot-forming elements included in said head constitute an array arranged at a predetermined pitch that is set as an interval between adjoining dot-forming elements in the secondary scanning direction, and the amount of feed Q in secondary scan is given by an equation below and expressed by a recording pitch of dots in the secondary scanning direction as a unit:

$$Q/S = N - k(j-i)$$

where k denotes the interval between the adjoining dot-forming elements in the secondary scanning direction expressed by the recording pitch of dots in the secondary scanning direction as the unit, i denotes an element number allocated to a dot-forming element located at a predetermined end of the effective dot-forming elements used for formation of dots before said selection, where element numbers are allocated to the plurality of dot-forming elements in order from an upper end of the array of the plurality of dot-forming elements in the secondary scanning direction, and j denotes an element number allocated to a dot-forming element located at the predetermined end of the effective dot-forming elements used for formation of dots after said selection.

9. A printing system in accordance with claim 6, wherein a number of the effective dot-forming elements selected for formation of dots among the plurality of dot-forming elements is varied in a predetermined sequence.

10. A printing system that drives a head to form a raster line, which comprises a row of dots aligned in a predetermined direction of a printing medium, and carries out a secondary scan, which shifts said printing medium relative to said head in a secondary scanning direction that is perpendicular to the predetermined direction every time when said raster line is formed, so as to print an image, wherein said head comprises a plurality of nozzles, which respectively form dots on said printing medium and are arrayed in the secondary scanning direction, said printing system comprising:

a memory which stores data applied to select at least part of the plurality of nozzles at least once after a start of printing the image as effective nozzles used for formation of dots, thereby changing the effective dot-forming elements;

a secondary scanning controller which carries out the secondary scan by an amount of feed in secondary scan specified after said selection, based on a positional relationship between effective nozzles used for formation of dots before said selection and effective nozzles used for formation of dots after said selection; and a print head controller which drives only the effective nozzles selected among the plurality of nozzles based on the data stored in said memory, so as to form dots.

11. A method of driving a head to form a raster line, which comprises a row of dots aligned in a predetermined direction of a printing medium, and carrying out a secondary scan, which shifts said printing medium relative to said head in a secondary scanning direction that is perpendicular to the predetermined direction every time when said raster line is formed, so as to print an image, said method printing the image with said head comprising a plurality of dot-forming elements, which respectively form dots on said printing medium and are arrayed in the secondary scanning direction, said method comprising the steps of:

(a) selecting at least part of the plurality of dot forming elements at least once after a start of printing the image as effective dot-forming elements used for formation of dots, thereby changing the effective dot-forming elements;

(b) setting an amount of feed in secondary scan after said selection, based on a positional relationship between effective dot-forming elements used for formation of dots before said selection and effective dot-forming elements used for formation of dots after said selection;

(c) carrying out the secondary scan by the amount of feed set in said step (b); and (d) driving only the effective dot-forming elements selected among the plurality of dot-forming elements to form dots.

12. In a printing system with a head having a plurality of dot-forming elements that respectively form dots, a recording medium on which a program is recorded in a computer-readable manner, said program controlling a secondary scan which shifts a printing medium relative to said head in a secondary scanning direction, said program comprising:

a first program code which causes a computer to select at least part of the plurality of dot-forming elements at least once after a start of printing an image as effective dot-forming elements used for formation of dots, thereby changing the effective dot-forming elements; and a second program code which causes the computer to set an amount of feed in secondary scan after said selection, based on a positional relationship between effective dot-forming elements used for formation of dots before said selection and effective dot-forming elements used for formation of dots after said selection.

* * * * *